US011482961B2

(12) United States Patent
Hoshino et al.

(10) Patent No.: US 11,482,961 B2
(45) Date of Patent: Oct. 25, 2022

(54) INVERTER CONTROL DEVICE

(71) Applicant: HITACHI AUTOMOTIVE SYSTEMS, LTD., Hitachinaka (JP)

(72) Inventors: Katsuhiro Hoshino, Hitachinaka (JP); Takafumi Hara, Tokyo (JP); Masaru Yamasaki, Tokyo (JP); Yosuke Tanabe, Tokyo (JP); Masanori Watanabe, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 582 days.

(21) Appl. No.: 16/471,786

(22) PCT Filed: Jan. 17, 2018

(86) PCT No.: PCT/JP2018/001139
§ 371 (c)(1),
(2) Date: Jun. 20, 2019

(87) PCT Pub. No.: WO2018/139295
PCT Pub. Date: Aug. 2, 2018

(65) Prior Publication Data
US 2020/0119678 A1 Apr. 16, 2020

(30) Foreign Application Priority Data
Jan. 30, 2017 (JP) .............................. JP2017-014725

(51) Int. Cl.
*H02P 23/04* (2006.01)
*H02P 27/08* (2006.01)

(52) U.S. Cl.
CPC .............. *H02P 23/04* (2013.01); *H02P 27/08* (2013.01)

(58) Field of Classification Search
CPC ................................. H02P 23/04; H02P 27/08
(Continued)

(56) References Cited

U.S. PATENT DOCUMENTS

2005/0231142 A1 10/2005 Yoshinaga
2012/0056569 A1 3/2012 Takamatsu
(Continued)

FOREIGN PATENT DOCUMENTS

JP      H4-145870 A     5/1992
JP      2005-304238 A   10/2005
(Continued)

OTHER PUBLICATIONS

International Search Report with English translation and Written Opinion issued in corresponding application No. PCT/JP2018/001139 dated May 1, 2018.

*Primary Examiner* — Kawing Chan
(74) *Attorney, Agent, or Firm* — Foley & Lardner LLP

(57) ABSTRACT

An object of the present invention is to effectively reduce vibration or noise caused by a motor. An inverter circuit 300 generates an alternating current from a direct current supplied from a direct current power supply 10 by using a plurality of IGBTs 311 which are switching elements, supplies the generated alternating current to a motor 100, and drives the motor 100. This alternating current includes a fundamental harmonic current corresponding to a rotational speed of the motor 100, and a harmonic current of a switching operation of the IGBTs 311. A controller 200 controls a second phase such that a first phase and the second phase are not superimposed on each other at a predetermined motor rotational speed, the first phase being a phase of an excitation force cyclically produced in the motor 100 by the fundamental harmonic current, and the second phase being a phase of an excitation force cyclically produced in the motor 100 by the harmonic current.

6 Claims, 22 Drawing Sheets

(58) Field of Classification Search
USPC .......................................................... 318/801
See application file for complete search history.

(56) References Cited

U.S. PATENT DOCUMENTS

| | | | |
|---|---|---|---|
| 2013/0002187 A1* | 1/2013 | Spreen | ................ H02P 23/0077 |
| | | | 318/811 |
| 2014/0015497 A1* | 1/2014 | Holliday | ................ F02G 1/043 |
| | | | 322/32 |
| 2014/0218183 A1* | 8/2014 | Van Schyndel | ......... G06F 3/016 |
| | | | 340/407.1 |
| 2015/0145451 A1* | 5/2015 | Semura | ................... H02P 29/50 |
| | | | 318/400.23 |
| 2017/0133961 A1* | 5/2017 | Akimatsu | ................. H02P 6/10 |

FOREIGN PATENT DOCUMENTS

| | | | |
|---|---|---|---|
| JP | 2007-20246 A | 1/2007 | |
| WO | WO-2010/137162 A1 | 12/2010 | |

* cited by examiner

INVERTER CONTROL DEVICE

TECHNICAL FIELD

The present invention relates to an inverter control device.

BACKGROUND ART

Conventionally, there is a known current control method for reducing vibration or noise caused by an electromagnetic excitation force deriving from a magnetic circuit structure of a motor in an alternating current motor which is driven by using an alternating current generated by PWM modulation of an inverter. PTL 1 discloses a method for attenuating a harmonic component of a radial magnetic excitation force by superimposing a magnetic sound reduction harmonic current including an n−1th order frequency in a reverse phase order and an m+1th order frequency in the same reverse phase order based on a fundamental frequency component of an alternating current distributed to the motor.

CITATION LIST

Patent Literature

PTL 1: JP 2005-304238 A

SUMMARY OF INVENTION

Technical Problem

The alternating current flowing to the motor is used to control driving of the motor, and includes a fundamental harmonic current component such as a sine wave whose frequency is converted according to a rotational speed of the motor, and a harmonic current component of a switching operation of the inverter. The frequency of the harmonic current is determined based on the frequency of the fundamental harmonic current and the frequency of a carrier wave used for PWM modulation. Hence, depending on the rotational speed of the motor, an electromagnetic excitation force produced in the motor by the fundamental harmonic current, and the electromagnetic excitation force produced in the motor by the harmonic current are superimposed, and cause significant vibration and noise. The method disclosed in PTL 1 cannot effectively improve this point.

Solution to Problem

An inverter control device according to the present invention is an inverter control device which controls an inverter which generates an alternating current from a direct current by using a plurality of switching elements, supplies the generated alternating current to a motor and drives the motor, and the alternating current includes a fundamental harmonic current corresponding to a rotational speed of the motor, and a harmonic current of a switching operation of the switching elements, and a second phase is controlled such that a first phase and the second phase are not superimposed on each other at a predetermined motor rotational speed, the first phase being a phase of an excitation force cyclically produced in the motor by the fundamental harmonic current, and the second phase being a phase of an excitation force cyclically produced in the motor by the harmonic current.

Advantageous Effects of Invention

According to the present invention, it is possible to effectively reduce vibration and noise caused by a motor.

DESCRIPTION OF EMBODIMENTS

First Embodiment

Figure 1:
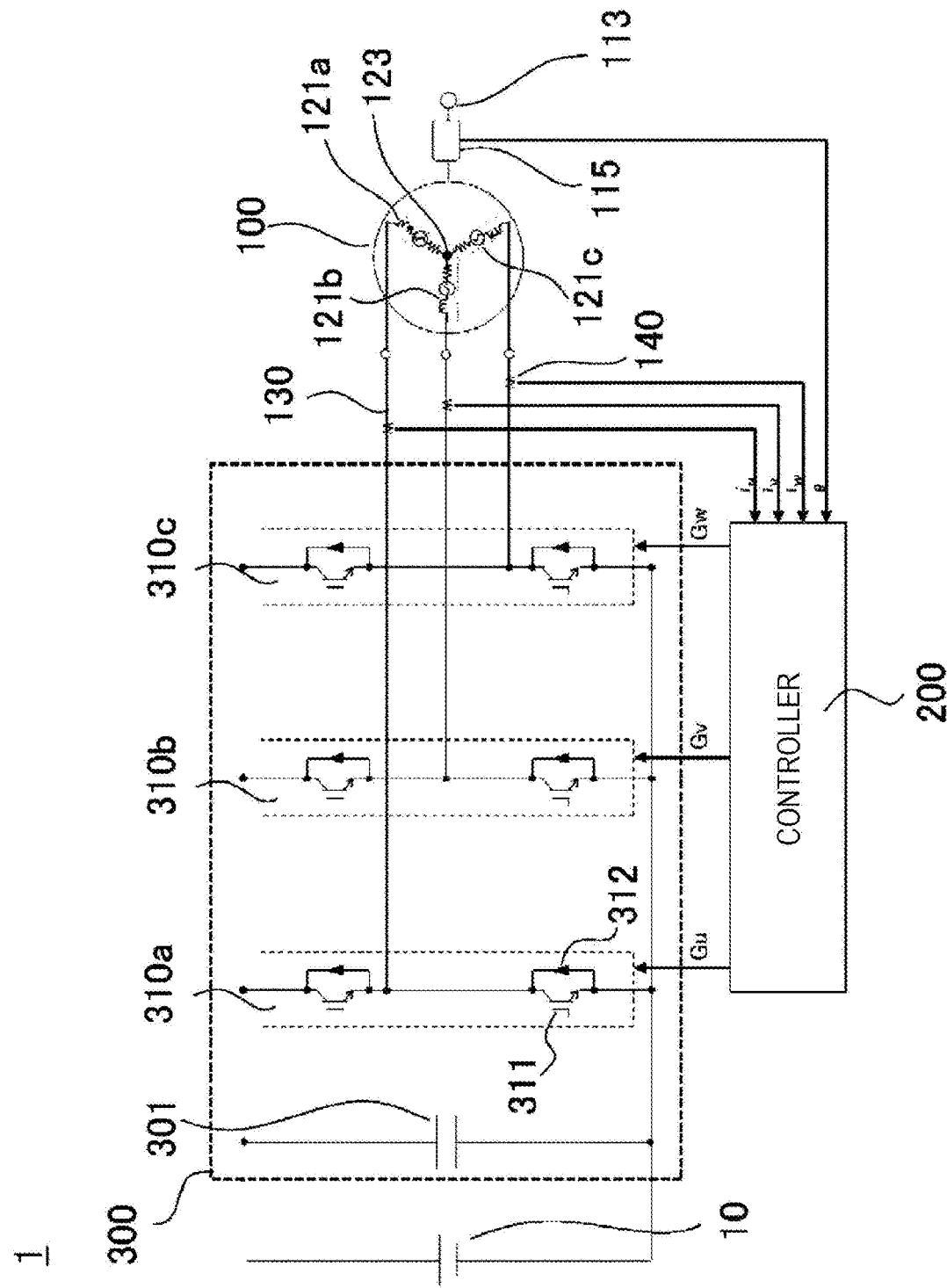
FIG. 1 is a diagram illustrating a configuration of a motor driving system according to a first embodiment of the present invention.

FIG. 1 is a diagram illustrating a configuration of a motor driving system 1 according to the first embodiment of the present invention. The motor driving system 1 includes a motor 100, a controller 200, and an inverter circuit 300.

The motor 100 which is a three-phase alternating current electric motor includes a U phase winding 121a, a V phase winding 121b, and a W phase winding 121c. One ends of the U phase winding 121a, the V phase winding 121b, and the W phase winding 121c are connected with the inverter circuit 300 via three alternating current output lines 130. Other ends of the U phase winding 121a, the V phase winding 121b, and the W phase winding 121c are connected with each other at a neutral point 123. A current sensor 140 is attached to each alternating current output line 130, and the current sensor 140 detects a current (a U phase current, a V phase current, or a W phase current) flowing in each phase of the motor 100. A magnetic pole position detector 115 is attached to the motor 100, and a magnetic pole position (rotation position) of the motor 100 is detected by a magnetic pole position detector 115.

The controller 200 receives an input of a U phase current signal Iu, a V phase current signal Iv, and a W phase current signal Iw respectively indicating magnitudes of the U phase current, the V phase current, and the W phase current detected by the current sensors 140. Furthermore, the controller 200 receives an input of a motor magnetic pole position signal θ indicating a magnetic pole position of the motor 100 detected by the magnetic pole position detector 115. The controller 200 generates drive signals Gu, Gv, and Gw for controlling the inverter circuit 300 based on these signals to output to the inverter circuit 300.

The inverter circuit 300 is connected with a direct current power supply 10, and includes a smoothing capacitor 301, and a U phase bridge circuit 310a, a V phase bridge circuit 310b, and a W phase bridge circuit 310c which are connected with the U phase winding 121a, the V phase winding 121b, and the W phase winding 121c of the motor 100, respectively, via the alternating current output lines 130. The smoothing capacitor 301 smooths a direct current voltage inputted from the direct current power supply 10. The bridge circuits 310a, 310b, and 310c of the respective phases each include two IGBTs (Insulated Gate Bipolar Transistor) 311 which function as switching elements of upper and lower arms, and two diodes 312 which are provided in parallel to each IGBT 311. In these bridge circuits, each IGBT 311 performs a switching operation according to the drive signals Gu, Gv, and Gw inputted from the controller 200. Thus, the direct current power supplied from the direct current power supply 10 is converted into three-phase alternating current power, and is output from the bridge circuits 310a, 310b, and 310c of the respective phases to the U phase winding 121a, the V phase winding 121b, and the W phase winding 121c of the motor 100, respectively, via the alternating current output lines 130 of the respective phases. The alternating current power is output from the inverter circuit 300 to the motor 100 in this way, so that the alternating current flows to each phase of the motor 100 to rotate and drive the motor 100, and this rotation driving force is output to an output shaft 113.

As described above, in the motor driving system 1, the inverter circuit 300 generates an alternating current from a direct current by using a plurality of IGBTs 311 which are switching elements, supplies the generated alternating current to the motor 100 and rotates and drives the motor 100. The controller 200 generates and outputs the drive signals Gu, Gv, and Gw to the inverter circuit 300 to control the inverter circuit 300.

Figure 2:
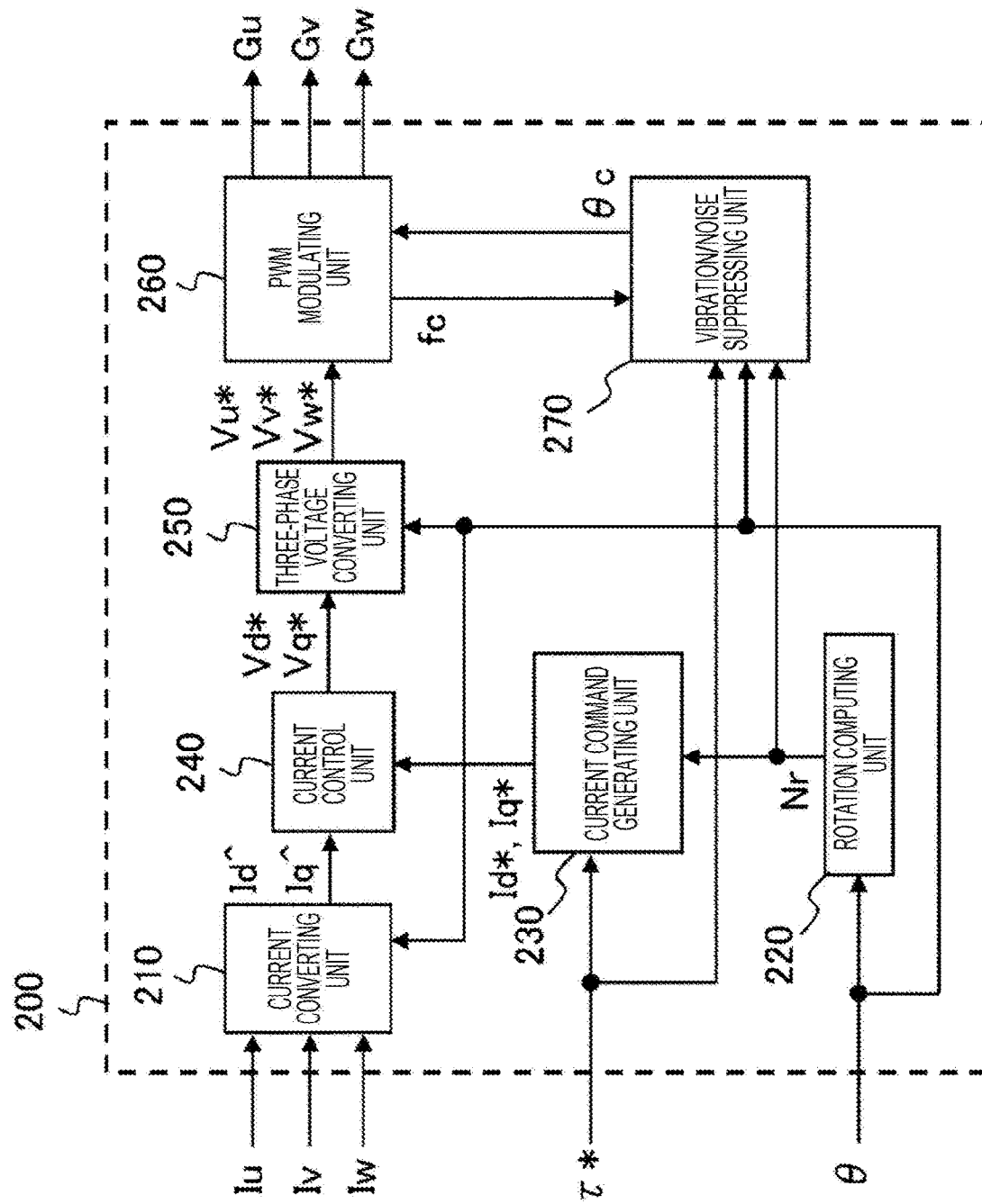
FIG. 2 is a functional block diagram of a controller.

FIG. 2 is a functional block diagram of the controller 200. The controller 200 functionally includes a current converting unit 210, a rotation computing unit 220, a current command generating unit 230, a current control unit 240, a three-phase voltage converting unit 250, a PWM modulating unit 260, and a vibration/noise suppressing unit 270. The controller 200 includes, for example, an unillustrated CPU, ROM, and RAM, and can realize each of these functions when the CPU executes a predetermined program stored in the ROM by using the RAM as a working area.

The current converting unit 210 obtains values of currents flowing to the respective phases of the motor 100 based on the U phase current signal Iu, the V phase current signal Iv, and the W phase current signal Iw from the current sensors 140. Furthermore, the current converting unit 210 performs dq conversion on these current values based on the motor magnetic pole position signal θ from the magnetic pole position detector 115, and outputs a d axis current detection value Id^ and a q axis current detection value Iq^.

The rotation computing unit 220 computes the rotational speed of the motor 100 based on the motor magnetic pole position signal θ from the magnetic pole position detector 115, and outputs a motor rotational speed signal Nr.

The current command generating unit 230 generates a d axis current command value Id* and a q axis current command value Iq* for the currents flowing in the motor 100 based on a torque command value τ* inputted from an unillustrated higher control device connected with the controller 200 and the motor rotational speed signal Nr from the rotation computing unit 220. These current command values generated by the current command generating unit 230 are output from the current command generating unit 230 to the current control unit 240. In addition, when, instead of the torque command value τ*, the current command values are inputted from the higher control device to the controller 200, the current command generating unit 230 may not be provided in the controller 200.

The current control unit 240 calculates and outputs a d axis voltage command value Vd* and a q axis voltage command value Vq* such that the d axis current detection value Id^ and the q axis current detection value Iq^ output from the current converting unit 210, and the d axis current command value Id* and the q axis current command value Iq* output from the current command generating unit 230 match each other.

The three-phase voltage converting unit 250 converts the d axis voltage command value Vd* and the q axis voltage command value Vq* output from the current control unit 240 into a U phase voltage command value Vu*, a V phase voltage command value Vv*, and a W phase voltage command value Vw* based on the motor magnetic pole position signal θ from the magnetic pole position detector 115.

The PWM modulating unit 260 performs PWM modulation (pulse width modulation) by using a carrier wave of a predetermined carrier frequency fc based on the U phase voltage command value Vu*, the V phase voltage command value Vv*, and the W phase voltage command value Vw* output from the three-phase voltage converting unit 250, and thereby generates the drive signals Gu, Gv, and Gw. Furthermore, the PWM modulating unit 260 outputs the generated drive signals Gu, Gv, and Gw to the inverter circuit 300, and thereby controls the switching operation of each IGBT 311 of the inverter circuit 300 and controls the alternating current power output from the inverter circuit 300 to the motor 100. Furthermore, the PWM modulating unit 260 outputs the carrier frequency fc of the carrier wave used for PWM modulation to the vibration/noise suppressing unit 270.

The vibration/noise suppressing unit 270 performs control for suppressing vibration and noise caused when the motor 100 is driven. More specifically, the vibration/noise suppressing unit 270 outputs a carrier wave phase signal θc for adjusting the phase of the carrier wave for PWM modulation to the PWM modulating unit 260 based on the motor rotational speed signal Nr from the rotation computing unit 220, the carrier frequency fc from the PWM modulating unit 260, the torque command value τ* from the higher control device, and the motor magnetic pole position signal θ from the magnetic pole position detector 115. The PWM modulating unit 260 adjusts the phase of the carrier wave based on this carrier wave phase signal θc and performs PWM modulation, so that it is possible to generate the drive signals Gu, Gv, and Gw to suppress the vibration and the noise caused when the motor 100 is driven.

A reason that the vibration and the noise of the motor 100 are suppressed by adjusting the phase of the carrier wave by PWM modulation as described above will be described below with reference to FIGS. 3 and 4.

Figure 3:
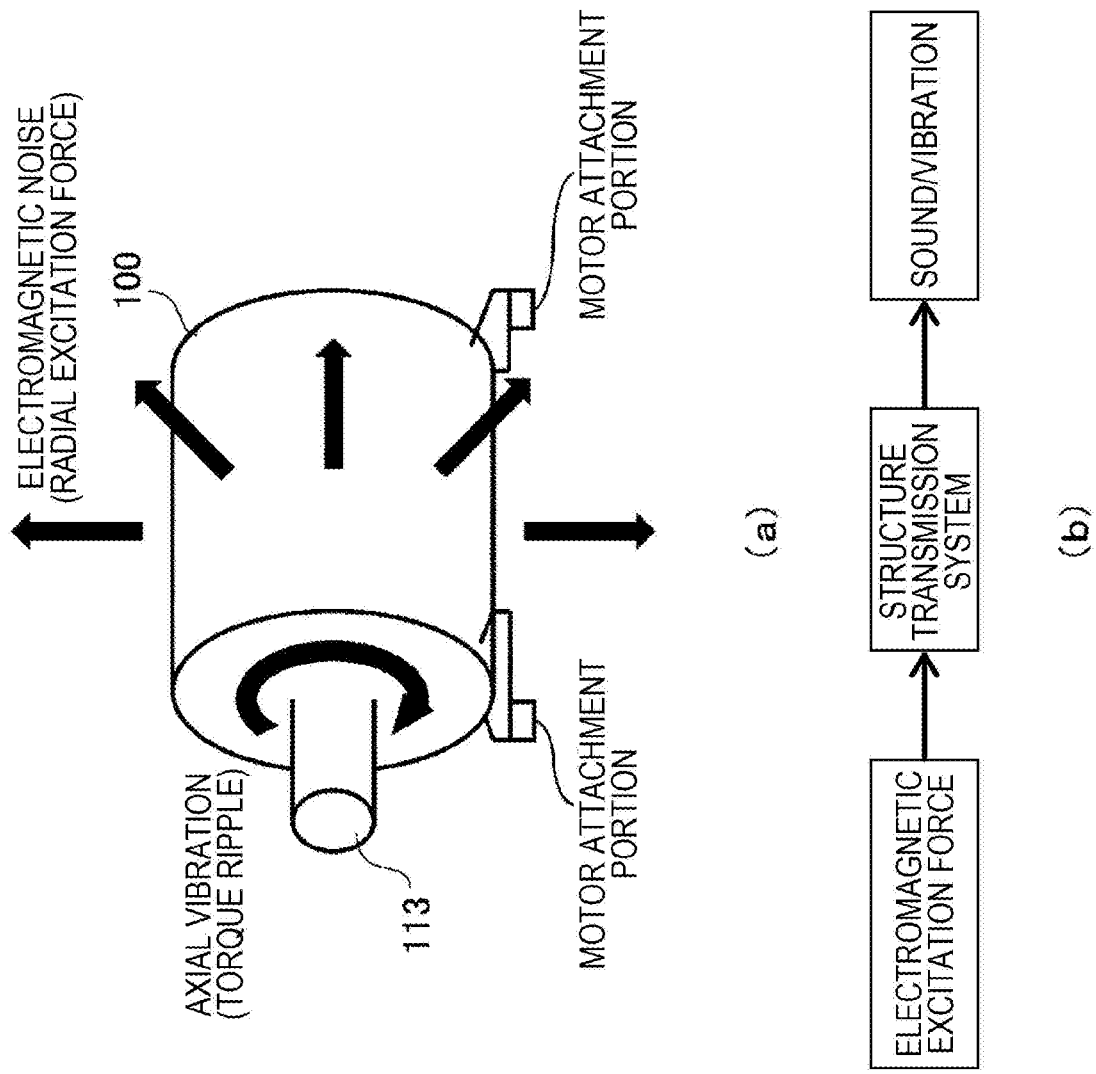
FIG. 3 is a view for explaining a mechanism which causes vibration and noise from a motor.

FIG. 3 is a view for explaining a mechanism which causes vibration or noise from the motor 100. As illustrated in FIG. 3(a), the motor 100 is installed in a structure such as a vehicle body with motor attachment portions. The vibration caused by the motor 100 includes an axial vibration (torque ripple) component of an electromagnetic excitation force produced in an axial rotation direction with respect to the output shaft 113, and a vibration component of the electromagnetic excitation force produced in the radial direction. The electromagnetic excitation force which produces these vibration components is produced by an electromagnetic force of the motor 100. The vibration caused by the motor 100 shakes the motor 100 itself, transmits to the structure in which the motor 100 is installed via the motor attachment portions, and shakes each portion of the structure. As a result, as the motor 100 vibrates, various parts cause vibration and noise. FIG. 3(b) illustrates this situation. Furthermore, when a natural mode and the frequency of the structure, and the vibration mode and the frequency of the motor 100 are superimposed, the structure and the motor 100 resonate, and therefore the vibration and the noise are amplified.

Figure 4:
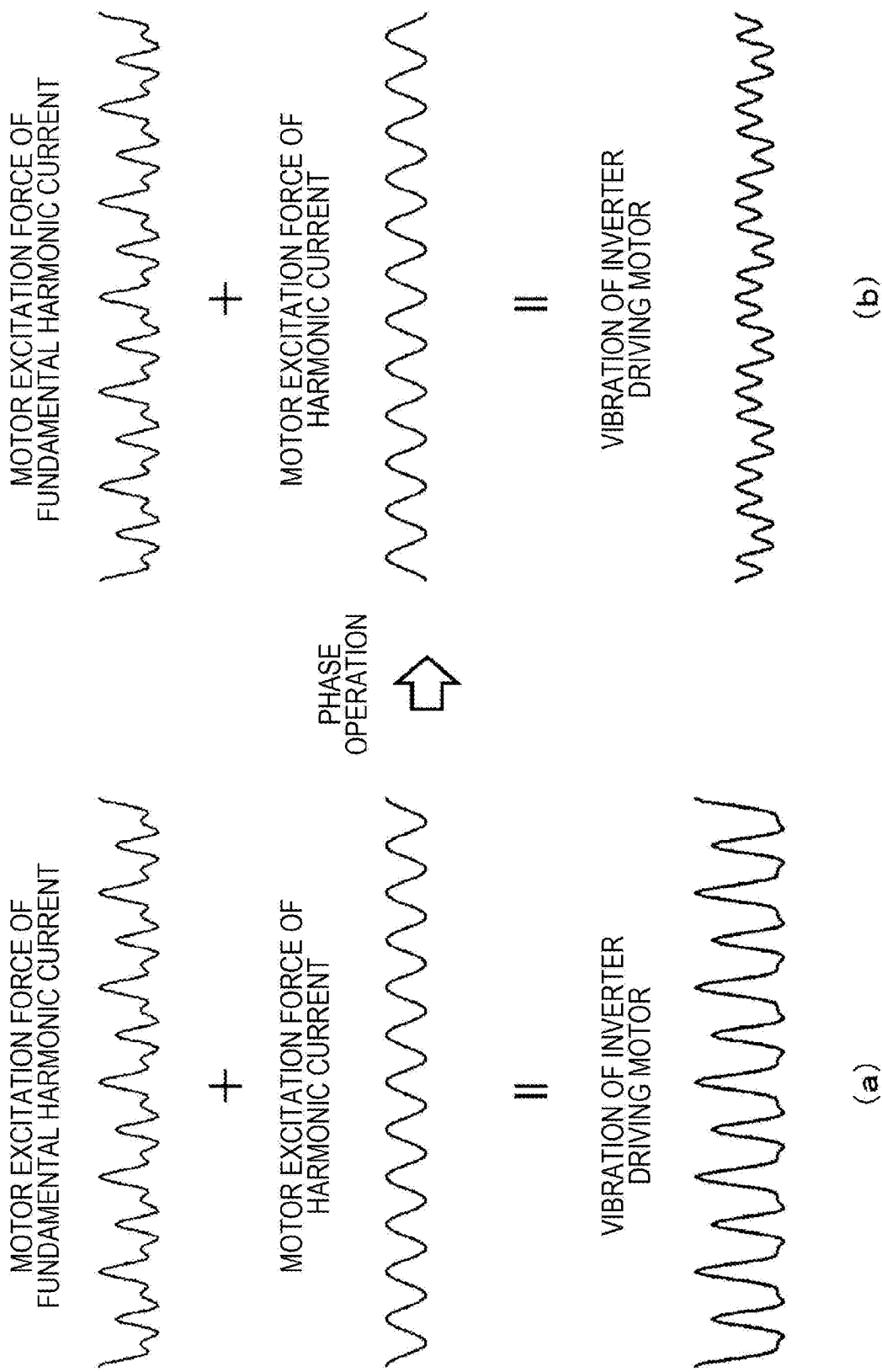
FIG. 4 is a diagram schematically illustrating the vibration caused in the motor.

FIG. 4 is a diagram schematically illustrating vibration caused in the motor 100. As illustrated in FIG. 4, the vibration of the motor 100 is illustrated as vibration obtained by synthesizing the electromagnetic excitation force produced in the motor 100 by the fundamental harmonic current and the electromagnetic excitation force produced in the motor 100 by the harmonic current. The fundamental harmonic current and the harmonic current are components each included in the alternating current of each phase flowing in the motor 100. The fundamental harmonic current is a current component of sine waves corresponding to the U phase voltage command value Vu*, the V phase voltage command value Vv*, and the W phase voltage command value Vw* calculated by the three-phase voltage converting unit 250 in the controller 200, and the frequency thereof is determined according to the rotational speed of the motor 100. On the other hand, the harmonic current is a current component produced secondarily by the switching operation of each IGBT 311 in the inverter circuit 300, and the frequency thereof is determined according to the frequency of the fundamental harmonic current and the frequency of the carrier wave used for PWM modulation.

In FIG. 4(a), the motor excitation force of the fundamental harmonic current and the motor excitation force of the harmonic current each cyclically change, and respective peak positions of these excitation forces substantially match with each other. Hence, these excitation forces enhance each other and increase the vibration amplitude of the motor 100. Thus, depending on the rotational speed of the motor 100, the electromagnetic excitation force produced in the motor 100 by the fundamental harmonic current, and the electromagnetic excitation force produced in the motor 100 by the harmonic current are superimposed in-phase, and cause significant vibration and noise.

Hence, according to the present invention, the vibration/noise suppressing unit 270 of the controller 200 performs control for operating a second phase such that a phase (hereinafter, referred to as the first phase) of the motor excitation force of the fundamental harmonic current and a phase (hereinafter, referred to as the second phase) of the motor excitation force of the harmonic current are not superimposed on each other. As a result, as illustrated in FIG. 4(b), it is possible to prevent these electromagnetic excitation forces from enhancing each other, and reduce the vibration of the motor 100. As a result, it is possible to suppress the vibration and the noise caused when the motor 100 is driven.

Figure 5:
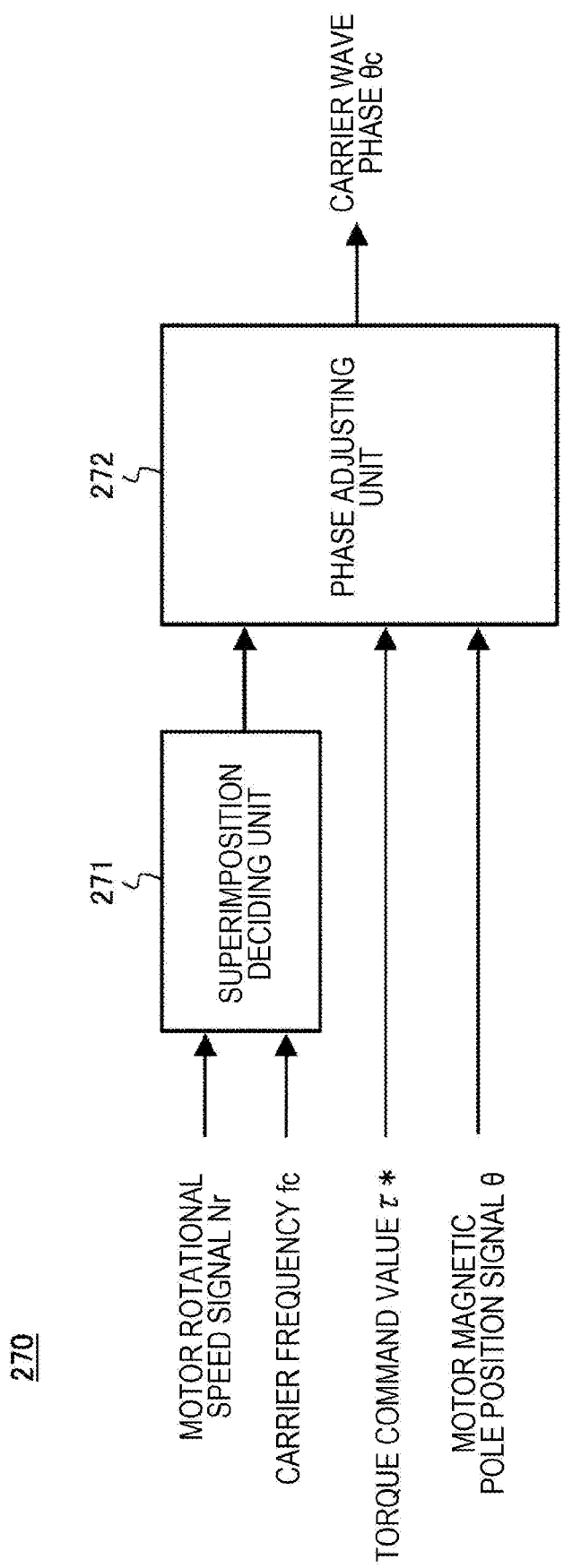
FIG. 5 is a functional block diagram of a vibration/noise suppressing unit according to the first embodiment of the present invention.

FIG. 5 is a functional block diagram of the vibration/noise suppressing unit 270 according to the first embodiment of the present invention. As illustrated in FIG. 5, in the present embodiment, the vibration/noise suppressing unit 270 includes a superimposition deciding unit 271 and a phase adjusting unit 272.

The superimposition deciding unit 271 decides whether or not there is a probability that the first phase and the second phase are superimposed based on the motor rotational speed signal Nr and the carrier frequency fc. More specifically, for example, the superimposition deciding unit 271 estimates the frequency of the motor excitation force of the fundamental harmonic current corresponding to the motor rotational speed signal Nr based on a relationship between the rotational speed of the motor 100 and the frequency of the fundamental harmonic current stored in advance. Furthermore, the superimposition deciding unit 271 estimates the frequency of the motor excitation force of the harmonic current corresponding to the motor rotational speed signal Nr and the carrier frequency fc based on the relationship between the rotational speed of the motor 100, the frequency of the carrier wave, and the frequency of the harmonic current stored in advance. As a result, when the difference between the estimated frequencies of the motor excitation forces is within a predetermined range, the superimposition deciding unit 271 decides that there is the probability that the first phase and the second phase are superimposed. The superimposition deciding unit 271 outputs a decision result to the phase adjusting unit 272.

In addition, the superimposition deciding unit 271 may decide whether or not there is the probability that the first phase and the second phase are superimposed by methods other than the above. For example, whether or not there is the probability that the first phase and the second phase are superimposed may be mapped and stored in advance in the controller 200 per value of the motor rotational speed signal Nr and the carrier frequency fc, and used to make decision.

When the superimposition deciding unit 271 decides that there is the probability that the first phase and the second phase are superimposed, the phase adjusting unit 272 determines the phase of the carrier wave such that these phases are not superimposed and outputs the carrier wave phase signal θc. More specifically, for example, the phase adjusting unit 272 estimates the first phase based on the torque command value τ* and the motor magnetic pole position signal θ, and determines the second phase such that the second phase is a reverse phase of the estimated first phase. Furthermore, the phase adjusting unit 272 determines the phase of the carrier wave corresponding to the determined second phase, and outputs the carrier wave phase signal θc. In this case, by mapping and storing the relationship between the torque and the magnetic pole position of the motor 100 calculated in advance by magnetic field analysis and the first phase in the controller 200, and using this relationship, the phase adjusting unit 272 can estimate the first phase based on the torque command value τ* and the motor magnetic pole position signal θ. In addition, the phase adjusting unit 272 may estimate the first phase by using the current command value output from the current command generating unit 230 or the higher control device instead of the torque command value.

In this regard, as described above, the vibration caused by the motor 100 includes the vibration component of the electromagnetic excitation force produced in the axial rotation direction of the motor 100, and the vibration component of the electromagnetic excitation force produced in the radial direction of the motor 100. Consequently, when the phase adjusting unit 272 estimates the first phase, it is preferable to estimate the phases of these electromagnetic excitation forces produced by the fundamental harmonic current as the first phases.

In addition, the phase adjusting unit 272 may determine the phase of the carrier wave by methods other than the above. For example, the phase adjusting unit 272 may map and store in the controller 200 in advance such a phase of the carrier wave that the motor excitation force of the fundamental harmonic current and the motor excitation force of the harmonic current cancel each other per value of the torque command value τ* and the motor magnetic pole position signal θ, and use and determine the phase of the carrier wave.

The phase adjusting unit 272 determines the phase of the carrier wave as described above, and outputs the carrier wave phase signal θc to the PWM modulating unit 260. The PWM modulating unit 260 adjusts the phase of the carrier wave according to the carrier wave phase signal θc from the phase adjusting unit 272, and performs PWM modulation. Consequently, it is possible to adjust the second phase and control the second phase such that the second phase is not superimposed on the first phase as described with reference to FIG. 4.

Figure 6:
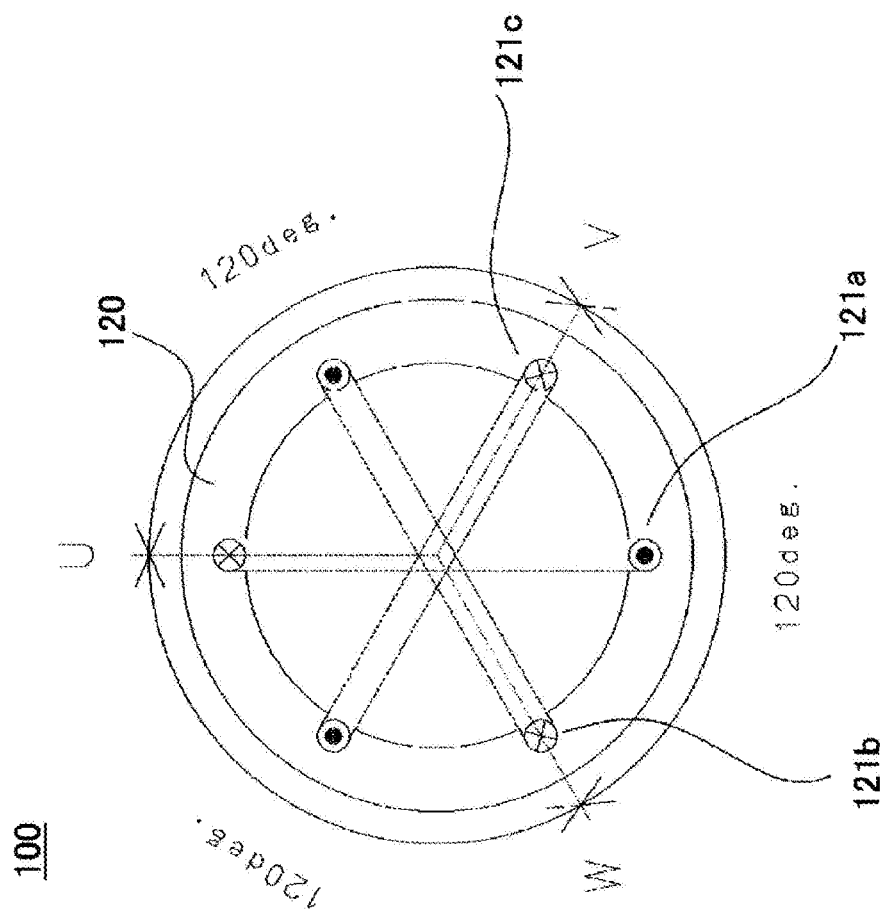
FIG. 6 is a view illustrating an example of a motor winding arrangement.

Next, a structure of the motor 100 will be described. FIG. 6 is a view illustrating an example of a winding arrangement of the motor 100. As illustrated in FIG. 6, the motor 100 includes a stator core 120. The U phase winding 121a, the V phase winding 121b, and the W phase winding 121c are each attached to the stator core 120 with a phase difference of an electrical angle of 120°.

Figure 7:
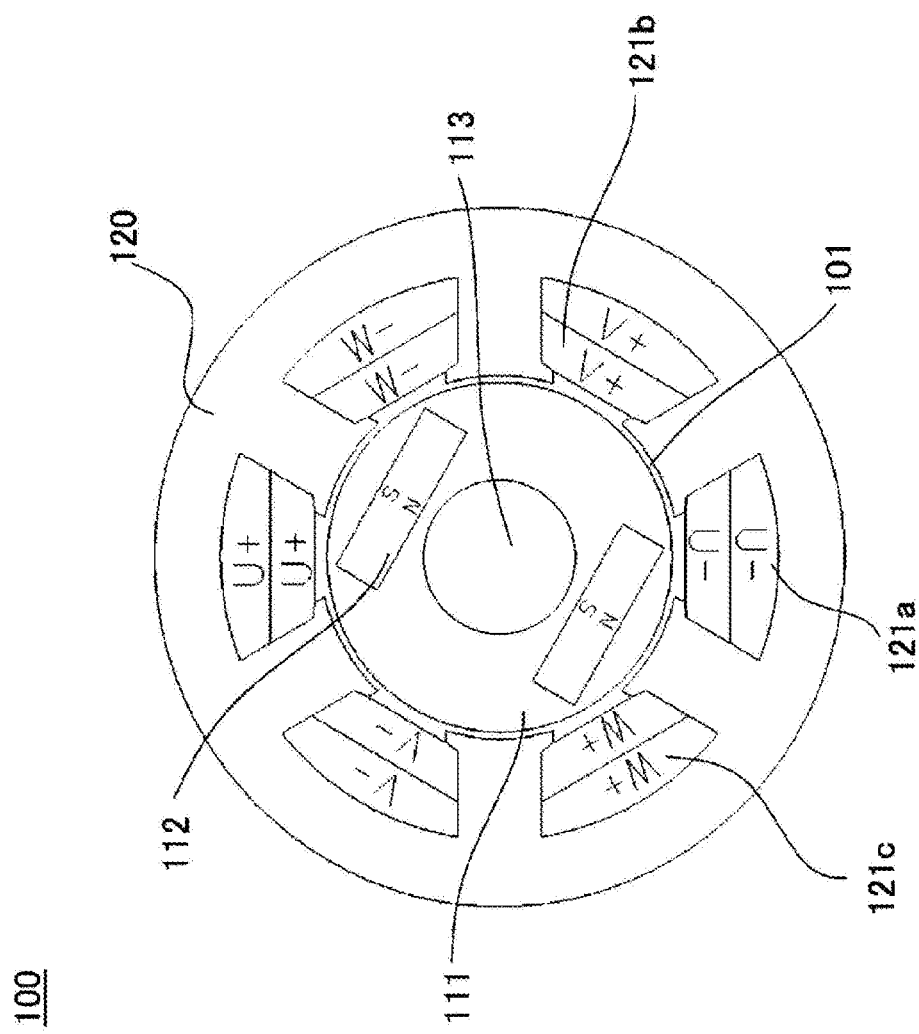
FIG. 7 is a view illustrating an example of a rotor structure and a stator structure of the motor.

FIG. 7 is a view illustrating an example of a rotor structure and a stator structure of the motor 100. As illustrated in FIG. 7, the motor 100 includes a rotor core 111 and the stator core 120. A plurality of permanent magnets 112 is buried inside the rotor core 111, and a gap 101 is formed between the rotor core 111 and the stator core 120 so that the rotor core 111 is fixed to the output shaft 113. Similarly to that described above with reference to FIG. 6, the U phase winding 121a, the V phase winding 121b, and the W phase winding 121c are each attached to the stator core 120 with the phase difference of the electrical angle of 120°.

In addition, FIGS. 6 and 7 illustrate a structure of a three-phase alternating current electric motor of two poles and six slots as a typical example of the motor 100. The three-phase alternating current electric motor having the numbers of poles and the numbers of slots other than the above may be used as the motor 100.

Figure 8:
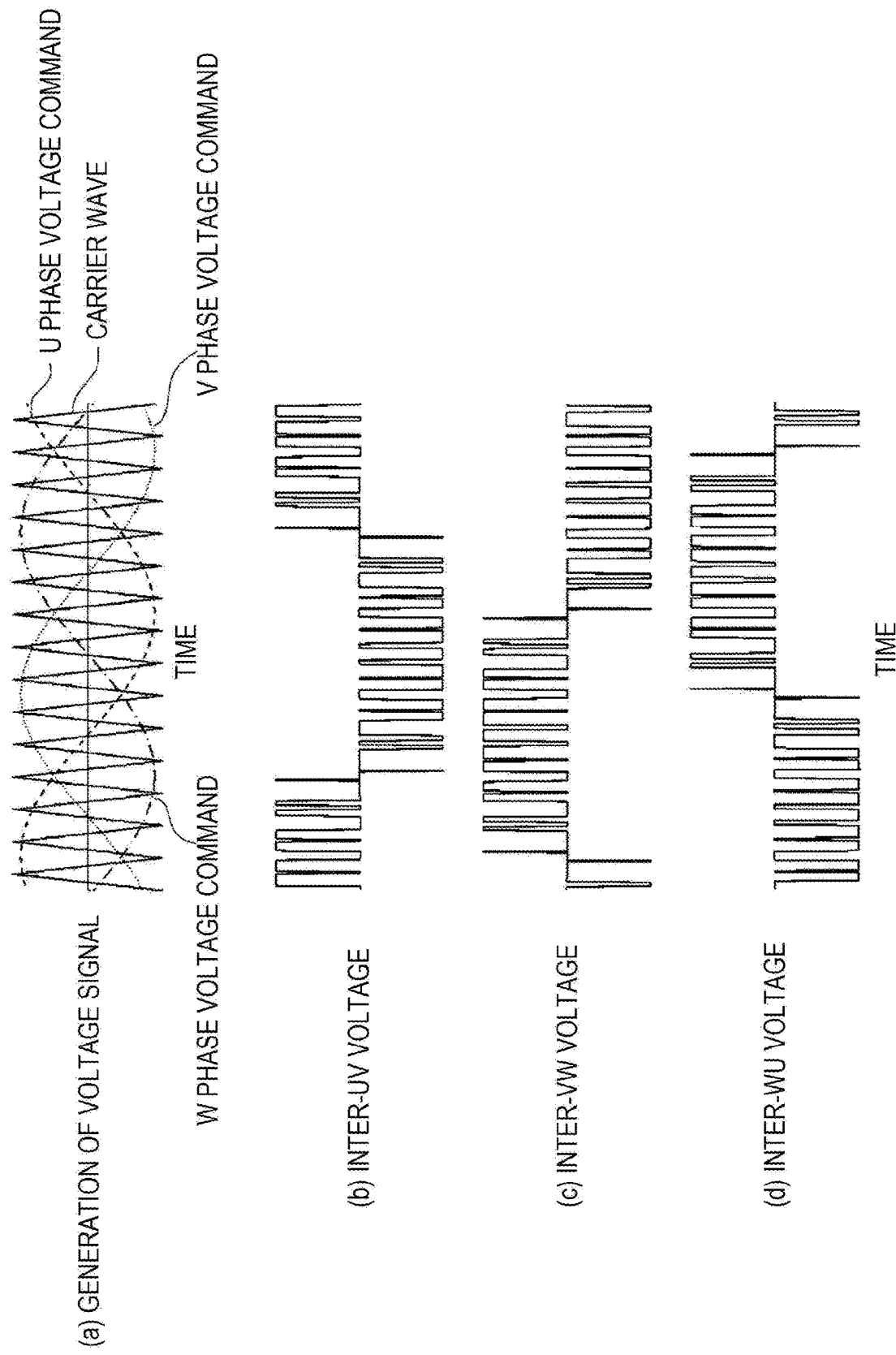
FIG. 8 is a diagram illustrating an example of a voltage signal and each line voltage.

Next, an output of the inverter circuit 300 will be described. FIG. 8 is a diagram illustrating an example of a voltage signal generated by the controller 200 and each line voltage output by the inverter circuit 300. The three-phase voltage converting unit 250 of the controller 200 generates the voltage signals including the U phase voltage command, the V phase voltage command, and the W phase voltage command as illustrated in, for example, FIG. 8(a), and outputs the voltage signals as the U phase voltage command value Vu*, the V phase voltage command value Vv*, and the W phase voltage command value Vw* respectively to the PWM modulating unit 260. The PWM modulating unit 260 performs PWM modulation by comparing these voltage signals with the carrier wave of the predetermined carrier frequency fc. The carrier wave is a triangular wave as illustrated in, for example, FIG. 8(a).

In the example illustrated in FIG. 8(a), when the frequency of each voltage command, i.e., the frequency of the fundamental harmonic current is f1, the carrier frequency fc is 15 times as large as f1. In other words, the frequency f1 of the fundamental harmonic current and the carrier frequency fc of the carrier wave have a relationship of fc/f1=15. When an operation state of the motor 100 changes, while the frequency f1 of the fundamental harmonic current changes in response to this change, the carrier frequency fc does not change and is constant. Hence, the value of fc/f1 changes according to the operation state of the motor 100.

FIG. 8(b) illustrates a change in an inter-UV voltage output from the inverter circuit 300 to between the U phase alternating current output line 130 and the V phase alternating current output line 130 according to the voltage signal illustrated in FIG. 8(a). Similarly, FIG. 8(c) illustrates a change in an inter-VW voltage output from the inverter circuit 300 to between the V phase alternating current output line 130 and the W phase alternating current output line 130. FIG. 8(d) illustrates a change in an inter-WU voltage output from the inverter circuit 300 to between the W phase alternating current output line 130 and the U phase alternating current output line 130.

Figure 9:
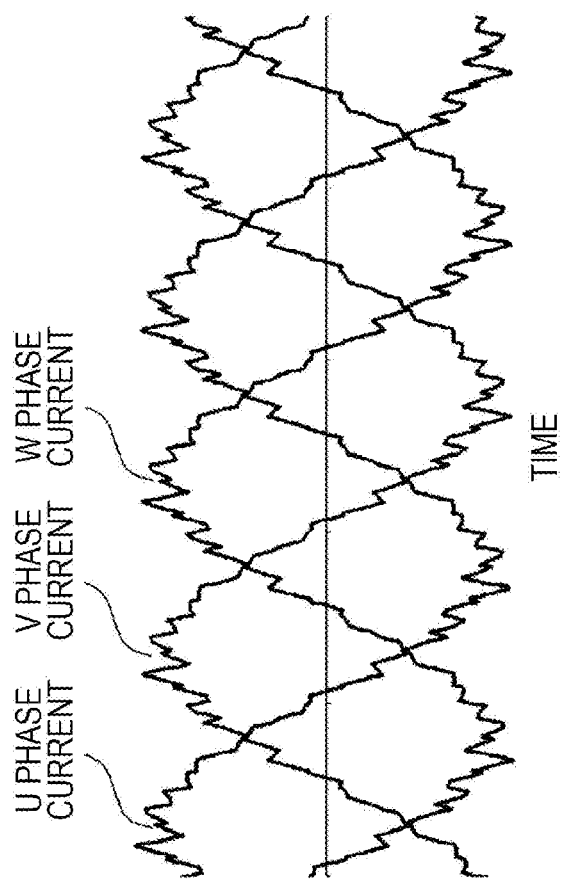
FIG. 9 is a current waveform diagram illustrating an example of a current flowing between the motor and an inverter circuit.

FIG. 9 is a current waveform diagram illustrating an example of a current flowing between the motor 100 and the inverter circuit 300 according to each line voltage illustrated in FIGS. 8(b) to (d). As illustrated in FIG. 9, each of the U phase, V phase, and W phase currents flowing between the motor 100 and the inverter circuit 300 includes a harmonic component produced by the switching operation of each IGBT 311 in the inverter circuit 300.

Figure 10:
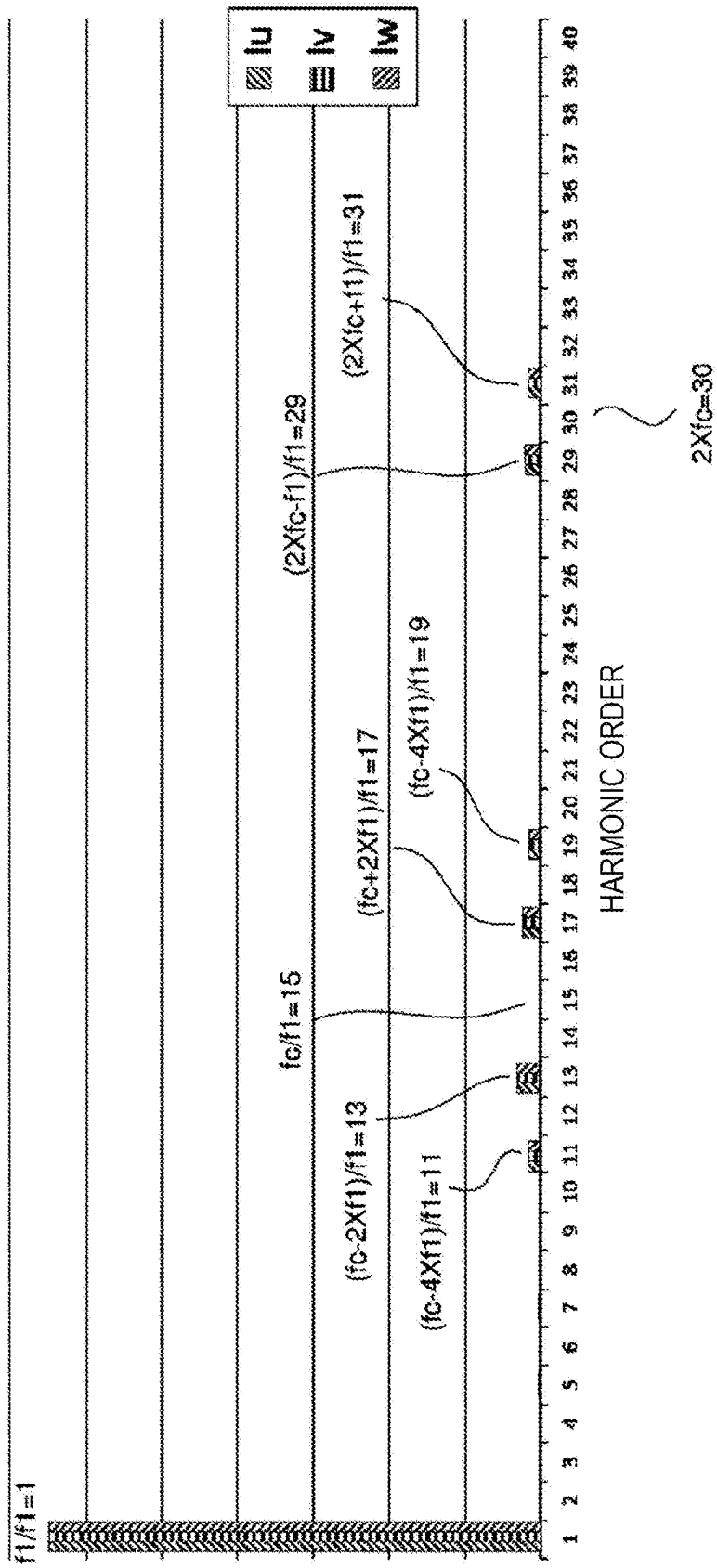
FIG. 10 is a diagram illustrating a component analysis result of each phase current.

FIG. 10 is a diagram illustrating a component analysis result of each phase current. When the carrier frequency fc is 15 times as large as the frequency f1 of the fundamental harmonic current as described above and when the frequency f1 of the fundamental harmonic current is a 1st order component, the carrier frequency fc corresponds to a 15th order component. In this case, as illustrated in FIG. 10, each phase current includes the 1st order component which is the fundamental harmonic current component and, in addition, fc±2×f1 sideband components (13th order and 17th order components), fc±4×f1 sideband components (11th order and 19th order components), and 2×fc±f1 sideband components (29th order and 31th order components) as harmonic current components.

The vibration caused by the motor 100 changes according to a magnetic circuit structure of the motor 100, and an excitation mode and the frequency of the excitation force of the fundamental harmonic current component are determined based on the number of poles, the number of slots, and the winding arrangement of the motor 100. On the other hand, as illustrated in FIG. 10, the frequency of the excitation force of the harmonic current component is determined based on the carrier frequency fc and the frequency f1 of the fundamental harmonic current. In addition, a component analysis result of each phase current illustrated in FIG. 10 is obtained when the carrier frequency fc is 15 times as large as the frequency f1 of the fundamental harmonic current, and the relationship between these frequencies changes according to the operation state of the motor 100. Therefore, the order of the harmonic current component included in each phase current changes from that illustrated in FIG. 10 according to the operation state of the motor 100.

Figure 11:
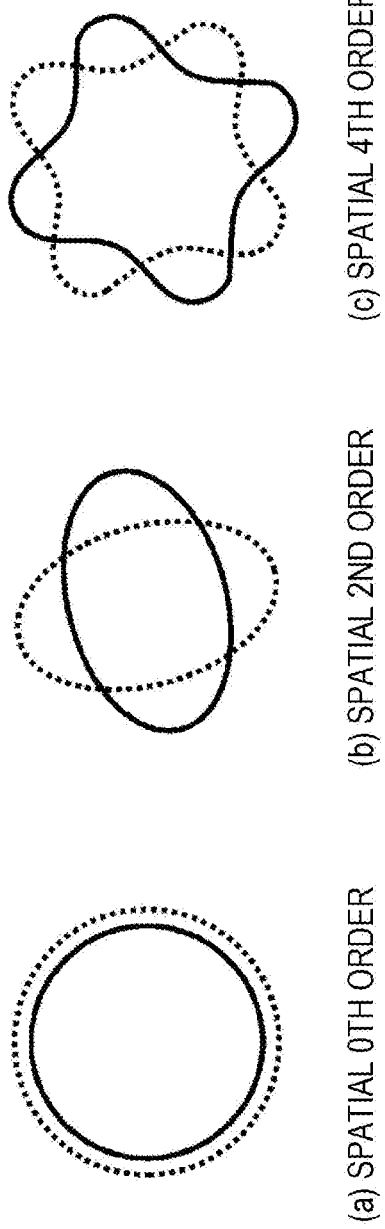
FIG. 11 is a view schematically illustrating an excitation mode in a radial direction of the motor.

FIG. 11 is a view schematically illustrating an excitation mode in the radial direction of the motor 100. In the radial direction of the motor 100, the electromagnetic force produced in the gap 101 of the motor 100 produces the excitation force of the excitation mode as illustrated in, for example, FIGS. 11(*a*), (*b*), and (*c*). The excitation mode illustrated in FIG. 11(*a*) is an excitation mode that the excitation force uniformly changes over time in the radial direction, and is referred to as a spatial (circular) 0th order mode. The excitation mode illustrated in FIG. 11(*b*) is an excitation mode that the excitation force elliptically changes over time in the radial direction, and is referred to as a spatial (circular) 2nd order mode. The excitation mode illustrated in FIG. 11(*c*) is an excitation mode which includes four sets of an antinode and a node, and is referred to as a spatial (circular) 4th order mode. In addition, the excitation mode illustrated in FIG. 11 and, in addition, excitation forces of various excitation modes are produced in the motor 100.

Figure 12:
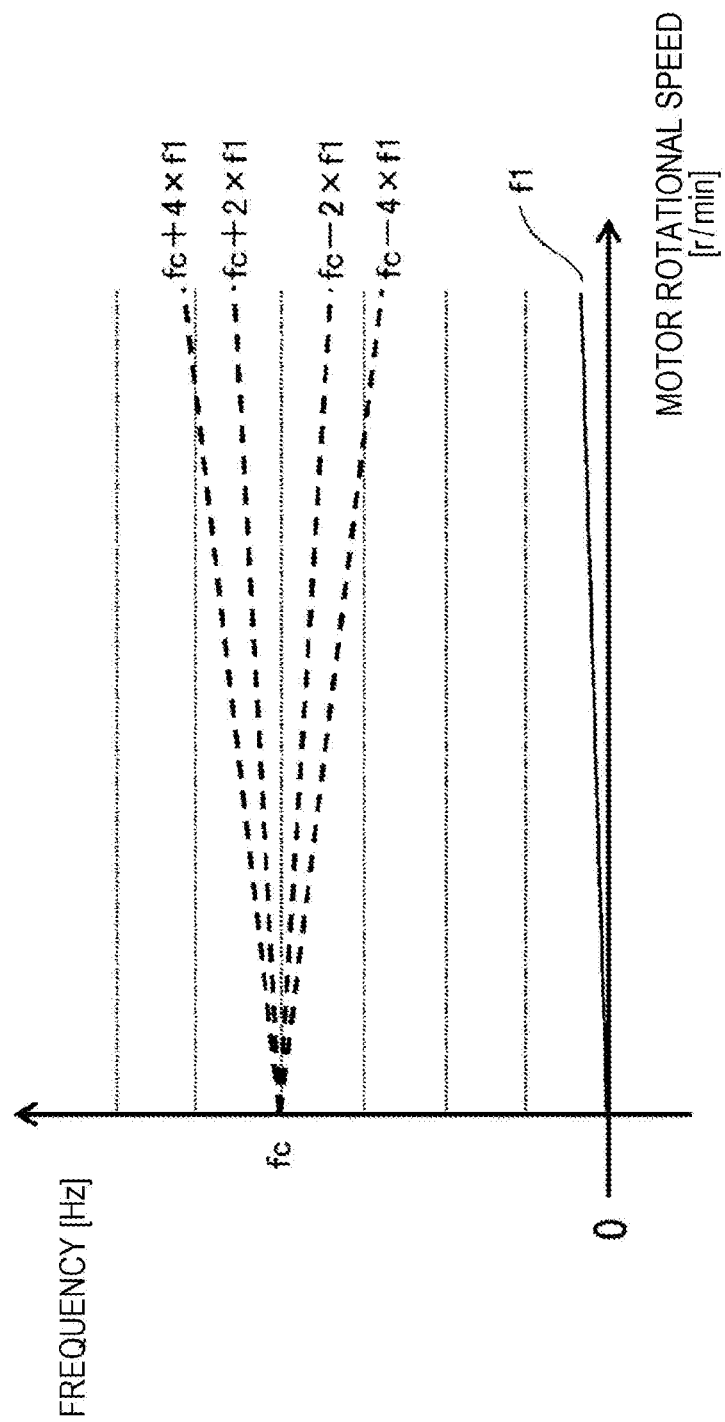
FIG. 12 is a diagram illustrating how a frequency of a current component changes in response to a change in a motor rotational speed.

FIG. 12 is a diagram illustrating how the frequency of the current component changes in response to a change in the motor rotational speed. As described with reference to FIG. 10, each phase current in a case where the carrier frequency fc is 15 times as large as the frequency f1 of the fundamental harmonic current includes each harmonic component of fc±2×f1 and fc±4×f1. When the rotational speed of the motor 100 changes, the frequencies of these harmonic components and the frequency f1 of the fundamental harmonic current component change as illustrated in FIG. 12. In FIG. 12, the frequency f1 of the fundamental harmonic current component increases in proportion to a rise of the motor rotational speed. On the other hand, the frequency of each harmonic current component widens in a radial pattern around the carrier frequency fc, and, when the motor rotational speed is higher, the interval between these frequencies expands.

Figure 13:
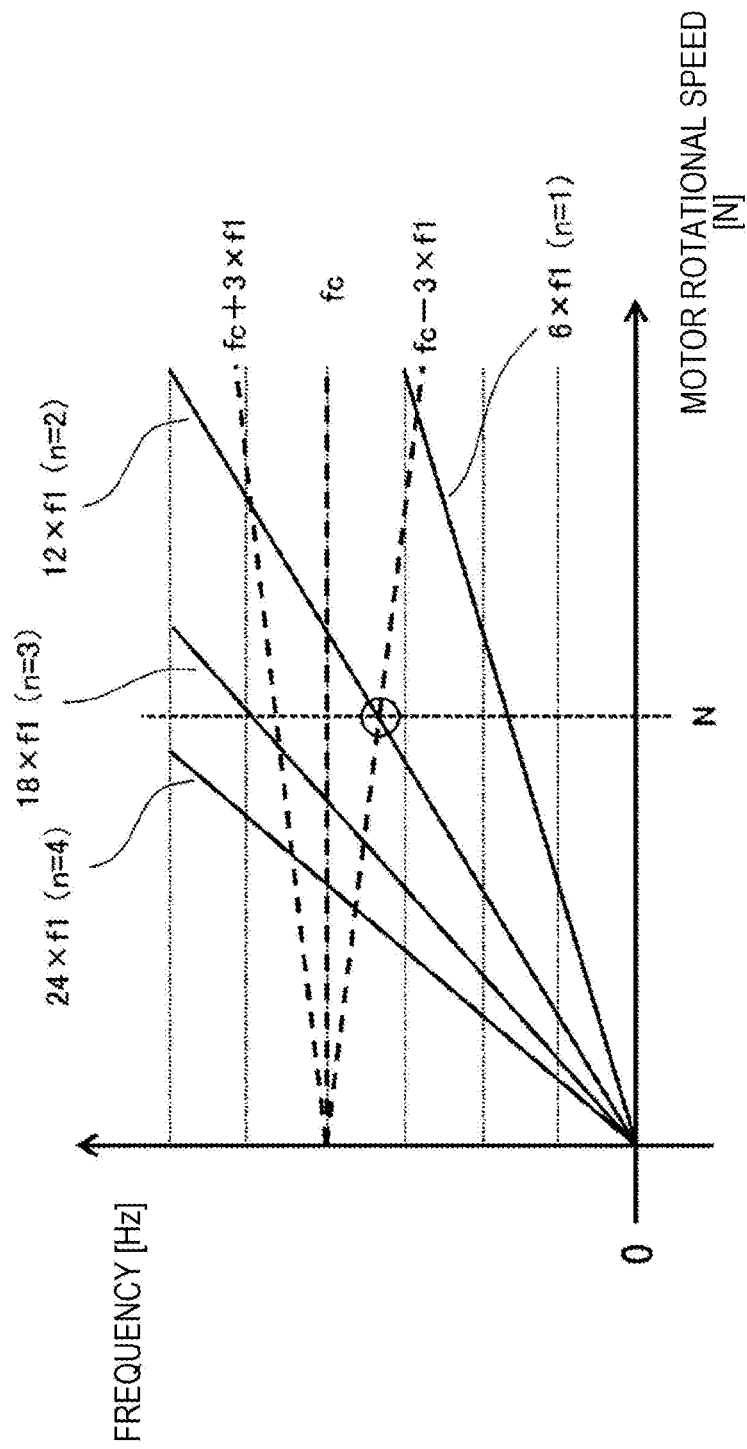
FIG. 13 is a diagram illustrating how frequencies of motor excitation forces of a fundamental harmonic current and a harmonic current change in response to the change in the motor rotational speed.

Next, the motor rotational speed in a case where the motor excitation force of the fundamental harmonic current and the motor excitation force of the harmonic current enhance each other will be described with reference to FIG. 13. FIG. 13 is a diagram illustrating how the frequencies of the motor excitation forces of the fundamental harmonic current and the harmonic current change in response to the change in the motor rotational speed as an example of an excitation force of a spatial (circular) 0th order mode illustrated in FIG. 11(*a*).

The frequency of the excitation force of the spatial (circular) 0th order mode among the motor excitation force of the fundamental harmonic current is known to become 6n times (n is a natural number) as large as the frequency f1 of the fundamental harmonic current. Hence, the frequency of this excitation force changes as indicated by each solid line in FIG. 13 according to the rotational speed of the motor 100. On the other hand, the frequency of the excitation force of the spatial (circular) 0th order mode among the motor excitation force of the harmonic current is known to become fc and fc±3×f1 with respect to the carrier frequency fc. Hence, the frequency of this excitation force changes as indicated by each broken line in FIG. 13 according to the rotational speed of the motor 100.

In this regard, when the motor rotational speed in FIG. 13 is N, as indicated a circle in FIG. 13, the excitation force (frequency: 12×f1) of the circular 0th order mode of the fundamental harmonic current, and the excitation force (frequency: fc−3×f1) of the circular 0th order mode of the harmonic current are simultaneously produced while being superimposed on each other. In this case, it is concerned that, when the phase of the motor excitation force of the fundamental harmonic current, i.e., the first phase, and the phase of the motor excitation force of the harmonic current, i.e., the second phase match, these excitation forces enhance each other, and therefore the vibration of the motor 100 becomes significant. Therefore, by changing the phase of the carrier wave in the controller 200 as described above, the present invention controls the second phase such that the first phase and the second phase are not superimposed. As a result, the excitation force of the fundamental harmonic current and the excitation force of the harmonic current cancel each other, so that it is possible to suppress vibration of the motor 100.

In addition, the motor excitation force of the fundamental harmonic current and the motor excitation force of the harmonic current are superimposed at other than the above-described motor rotational speed, so that it is possible to cancel these excitation forces and suppress vibration of the motor 100. For example, the excitation force (frequency: 24×f1) of the circular 0th order mode of the fundamental harmonic current and the excitation force (frequency: fc) of the circular 0th order mode of the harmonic current match, so that, by changing the phase of the carrier wave likewise and controlling the second phase, it is possible to cancel these excitation forces.

Figure 14:
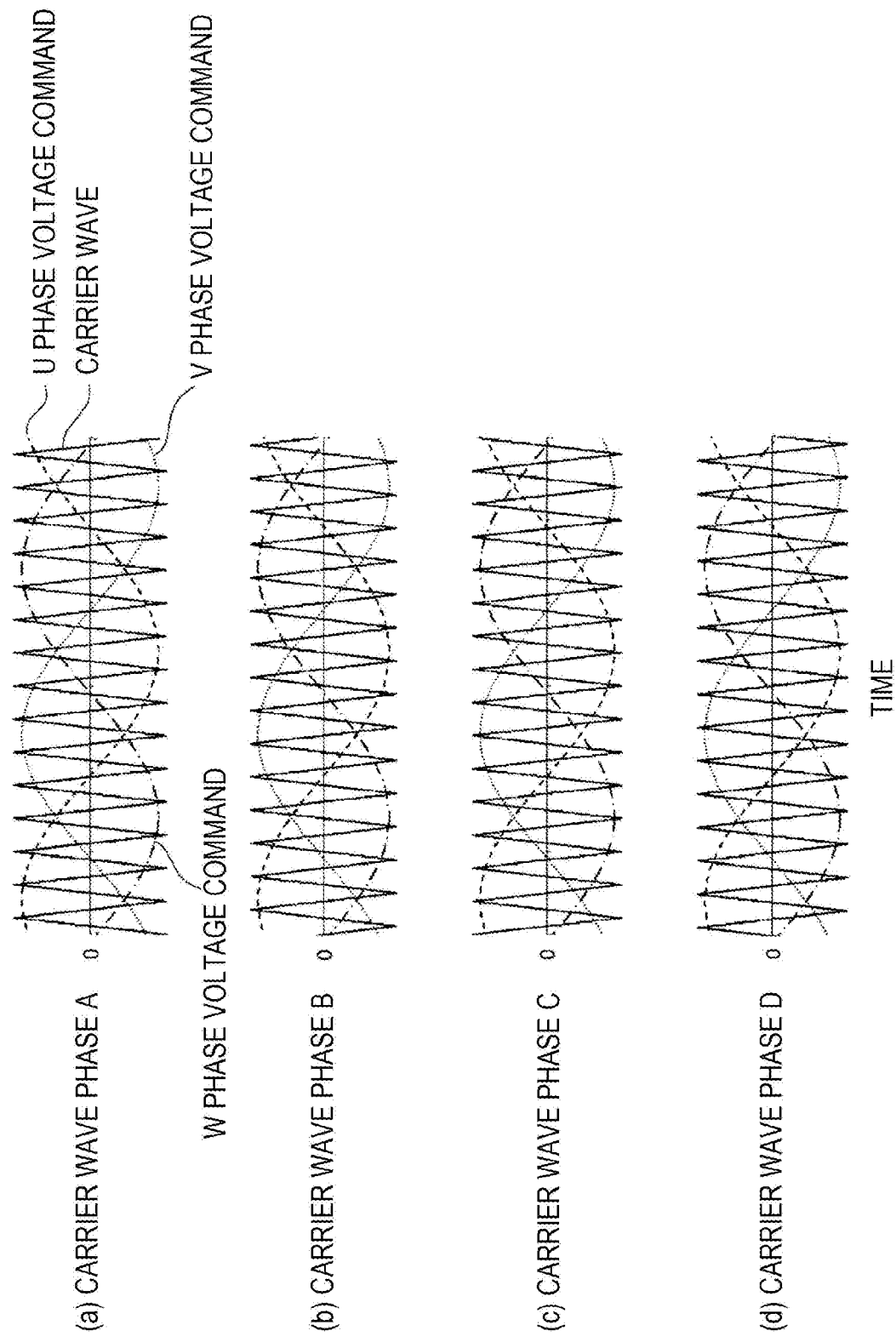
FIG. 14 is a diagram illustrating how a phase of a carrier wave is changed.

FIG. 14 is a diagram illustrating how the phase of the carrier wave is changed. The controller 200 changes the phase of the carrier wave to one of A, B, C, and D in response to the voltage command of each phase as illustrated in each example in FIGS. 14(*a*), (*b*), (*c*), and (*d*) such that the first phase and the second phase are not superimposed as described above. These carrier wave phases are shifted from each other in response to each voltage command of the U phase, the V phase, and the W phase. By adjusting the phase of the carrier wave in this way, it is possible to adjust the second phase.

Figure 15:
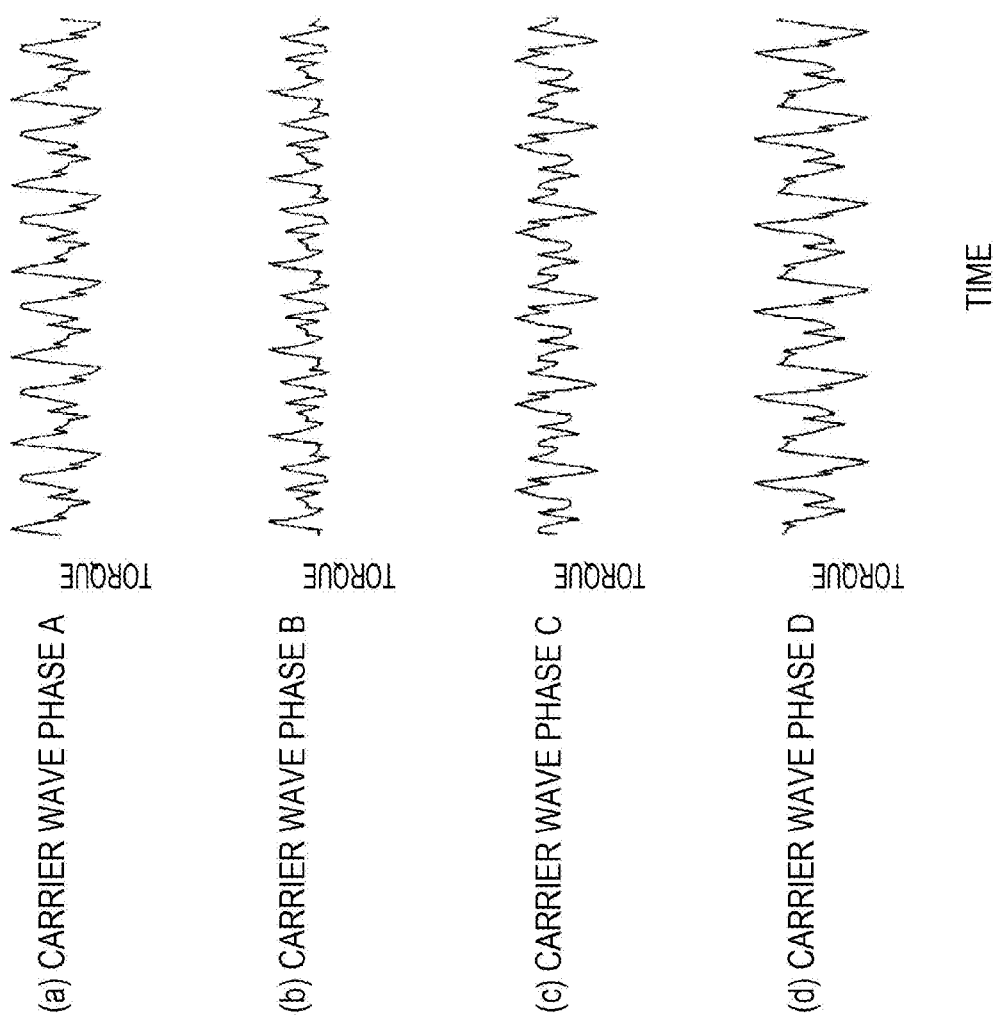
FIG. 15 is a diagram illustrating how a torque ripple changes when the phase of the carrier wave is changed.

FIG. 15 is a diagram illustrating how a torque ripple changes when the phase of the carrier wave is changed. Each torque waveform in FIGS. 15(*a*), (*b*), (*c*), and (*d*) corresponds to the carrier wave phases A to D illustrated in FIG. 14, and magnitudes of amplitudes indicating the torque ripples are different from each other. It is found that, by changing the phase of the carrier wave from these torque waveforms, the magnitude of the torque ripple which is the electromagnetic excitation force produced in the axial rotation direction of the motor 100 changes.

Figure 16:
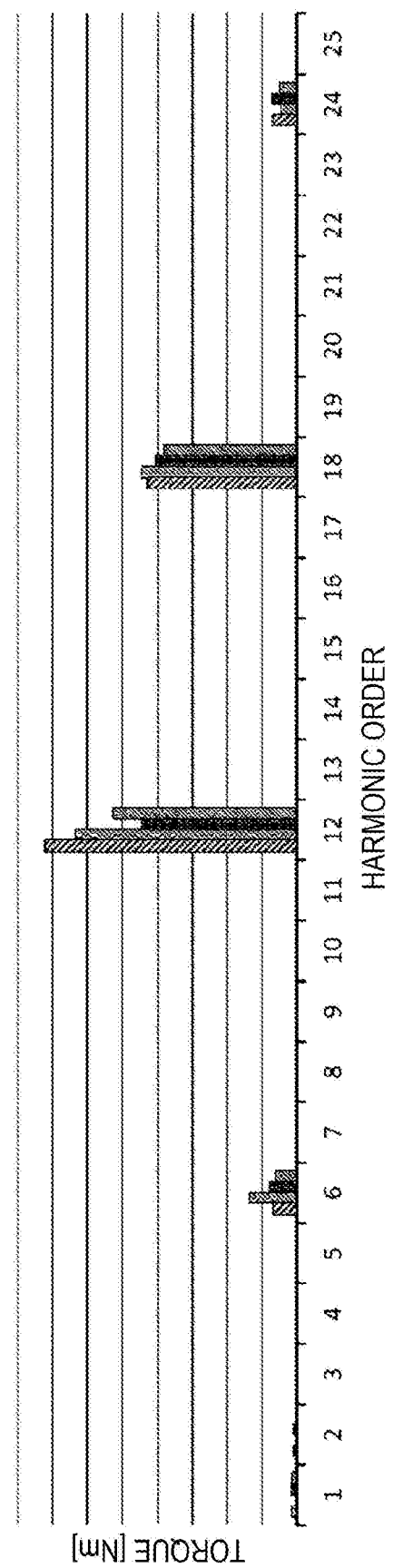
FIG. 16 is a diagram illustrating an analysis result of a harmonic included in a torque waveform.

FIG. 16 is a diagram illustrating an analysis result of a harmonic included in each torque waveform illustrated in FIG. 15. In FIG. 16, a harmonic order indicated by a horizontal axis indicates a multiplying factor with respect to the frequency f1 of the fundamental harmonic current. In the example of the present embodiment, as described with reference to FIG. 13, at a motor rotational speed at which an excitation force (frequency: 12×f1) of the circular 0th order mode of the fundamental harmonic current, and the excitation force (frequency: fc−3×f1) of the circular 0th order mode of the harmonic current are superimposed on each other, the phase of the carrier wave is adjusted. Hence, the analysis result in FIG. 16 shows that the magnitude of the 12th order harmonic component changes per carrier wave phase, and is at minimum in a case of the carrier wave phase C. Magnitudes of other order harmonic components also change depending on the carrier wave phase. By adjusting the phase of the carrier wave in this way, it is possible to reduce the torque ripple which is the electromagnetic excitation force produced in the axial rotation direction of the motor 100.

Figure 17:
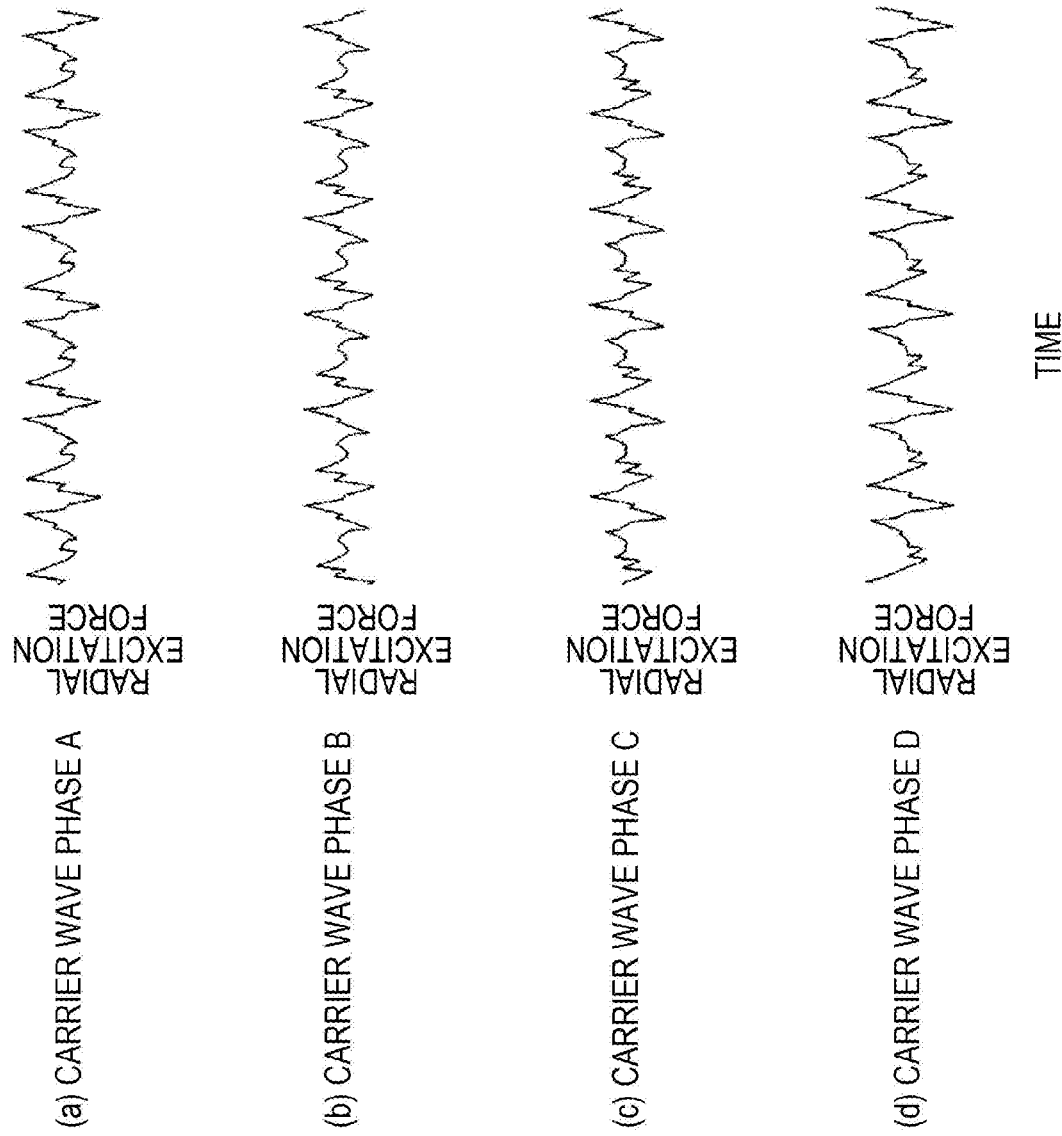
FIG. 17 is a diagram illustrating how a radial excitation force changes when the phase of the carrier wave is changed.

FIG. 17 is a diagram illustrating how a radial excitation force changes when the phase of the carrier wave is changed. Each excitation force waveform in FIGS. 17(a), (b), (c), and (d) corresponds to each of the carrier wave phases A to D illustrated in FIG. 14, and the magnitudes of the amplitudes are different from each other. It is found that, by changing the phase of the carrier wave from these excitation force waveforms, the magnitude of the electromagnetic excitation force produced in the radial direction of the motor 100 changes.

Figure 18:
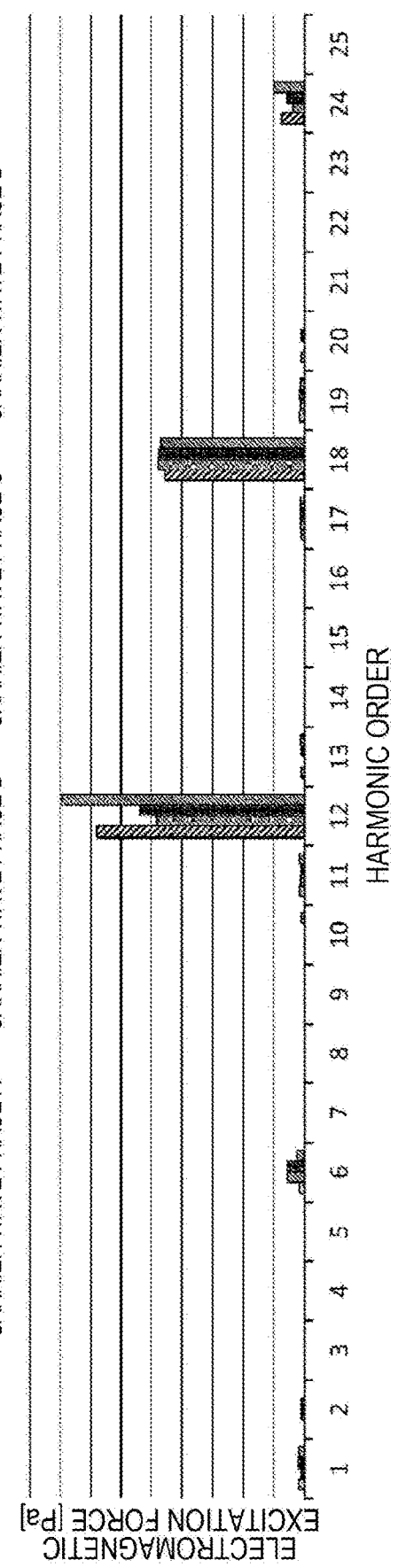
FIG. 18 is a diagram illustrating an analysis result of the harmonic included in the excitation force waveform.

FIG. 18 is a diagram illustrating an analysis result of the harmonic included in each excitation force waveform illustrated in FIG. 17. In FIG. 18, a harmonic order indicated by a horizontal axis indicates a multiplying factor with respect to the frequency f1 of the fundamental harmonic current. In the example of the present embodiment, as described with reference to FIG. 13, at a motor rotational speed at which an excitation force (frequency: 12×f1) of the circular 0th order mode of the fundamental harmonic current, and the excitation force (frequency: fc−3×f1) of the circular 0th order mode of the harmonic current are superimposed on each other, the phase of the carrier wave is adjusted. Hence, the analysis result in FIG. 18 shows that the magnitude of the 12th order harmonic component changes per carrier wave phase, and is at minimum in a case of the carrier wave phase B. Magnitudes of other order harmonic components also change depending on the carrier wave phase. By adjusting the phase of the carrier wave in this way, it is possible to reduce the electromagnetic excitation force produced in the radial direction of the motor 100.

The above-described first embodiment of the present invention provides the following function and effect.

(1) The inverter circuit 300 generates an alternating current from a direct current supplied from the direct current power supply 10 by using a plurality of IGBTs 311 which are switching elements, supplies the generated alternating current to the motor 100, and drives the motor 100. This alternating current includes a fundamental harmonic current corresponding to the rotational speed of the motor 100, and the harmonic current of the switching operation of the IGBTs 311. The controller 200 controls the inverter circuit 300, and controls the second phase such that the first phase which is a phase of an excitation force cyclically produced in the motor 100 by the fundamental harmonic current and the second phase which is a phase of an excitation force cyclically produced in the motor 100 by the harmonic current are not superimposed on each other at the predetermined motor rotational speed N. Thus, it is possible to effectively reduce vibration and noise caused by the motor 100.

(2) The controller 200 includes the PWM modulating unit 260, the superimposition deciding unit 271, and the phase adjusting unit 272. The PWM modulating unit 260 performs PWM modulation by using the carrier wave of the predetermined carrier frequency fc, and generates the drive signals Gu, Gv, and Gw for controlling the switching operation of IGBTs 311. The superimposition deciding unit 271 decides whether or not there is a probability that the first phase and the second phase are superimposed based on the rotational speed of the motor 100 and the carrier frequency fc. When the superimposition deciding unit 271 decides that there is the probability that the first phase and the second phase are superimposed, the phase adjusting unit 272 adjusts the second phase such that the second phase is not superimposed on the first phase. By so doing, when there is a probability that the first phase and the second phase are superimposed, it is possible to reliably prevent the first phase and the second phase from being superimposed.

(3) The phase adjusting unit 272 estimates the first phase based on the torque command value τ* for a torque produced by the motor 100 or the current command value for the alternating current, and the magnetic pole position of the motor 100, and adjusts the second phase based on the estimated first phase. Thus, it is possible to appropriately adjust the second phase such that the first phase and the second phase are not superimposed.

(4) The phase adjusting unit 272 can estimate as the first phase each of the phase of the excitation force produced in the axial rotation direction of the motor 100 by the fundamental harmonic current, and the phase of the excitation force produced in the radial direction of the motor 100 by the fundamental harmonic current. By so doing, it is possible to appropriately estimate the first phase for the excitation force produced in the motor 100.

(5) The phase adjusting unit 272 adjusts the second phase by adjusting the phase of the carrier wave used for PWM modulation. Thus, it is possible to reliably adjust the second phase by easy control.

Second Embodiment

Figure 19:
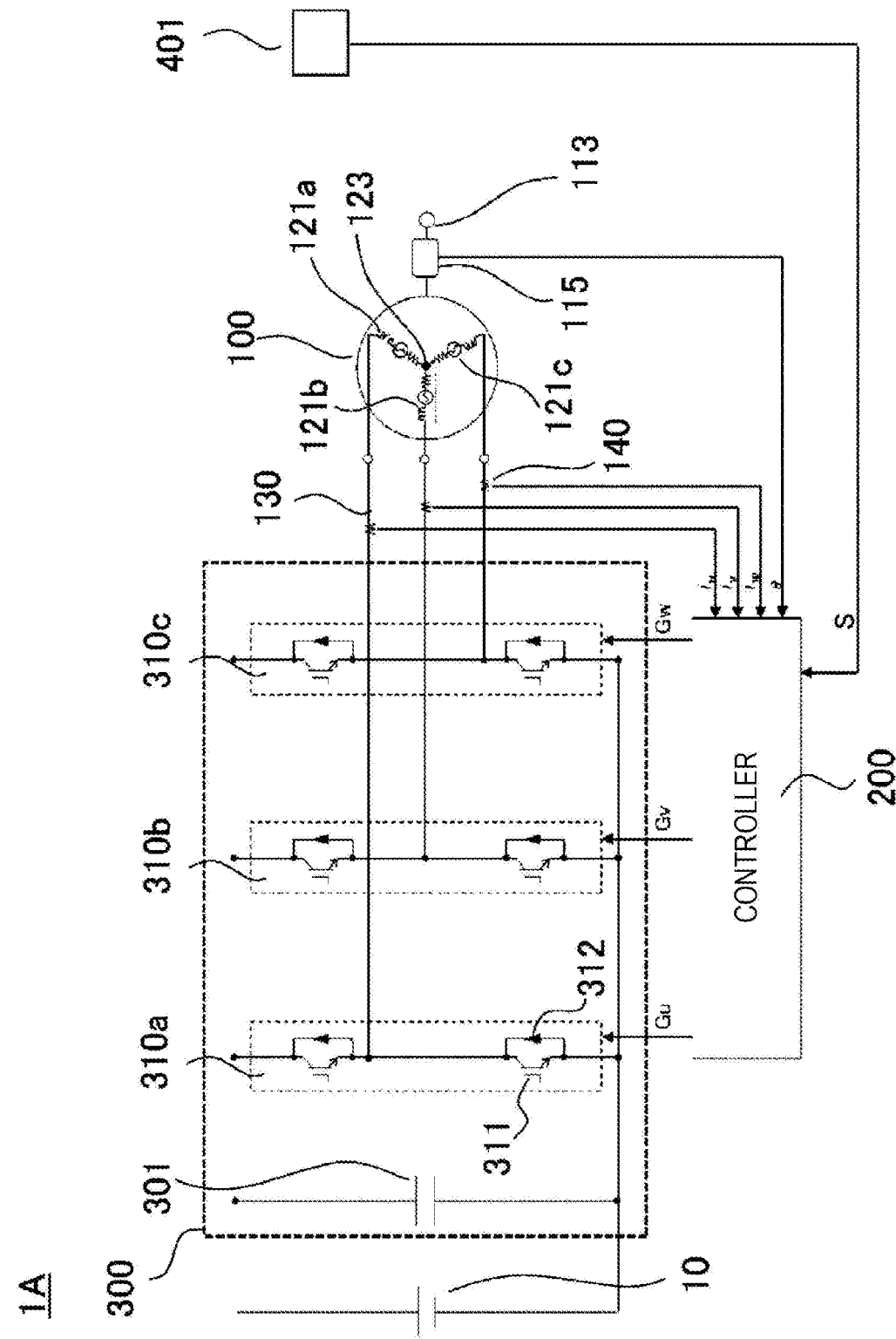
FIG. 19 is a diagram illustrating a configuration of a motor driving system according to a second embodiment of the present invention.

Next, the second embodiment of the present invention will be described. FIG. 19 is a diagram illustrating a configuration of a motor driving system 1A according to the second embodiment of the present invention. The motor driving system 1A illustrated in FIG. 19 differs in further including a vibration sensor 401 from a motor driving system 1 described in the first embodiment.

The vibration sensor 401 detects vibration of a motor 100, and outputs a vibration signal S corresponding to a detection result to a controller 200. The vibration sensor 401 is attached to the motor 100 or a structure provided around the motor 100. For example, an acceleration sensor or a speed sensor is used for the vibration sensor 401.

In the present embodiment, the controller 200 functionally includes the same components as those in the functional block diagram in FIG. 2 described in the first embodiment. However, control contents performed in a vibration/noise suppressing unit 270 is different from that in the first embodiment. This point will be described in more detail below.

Figure 20:
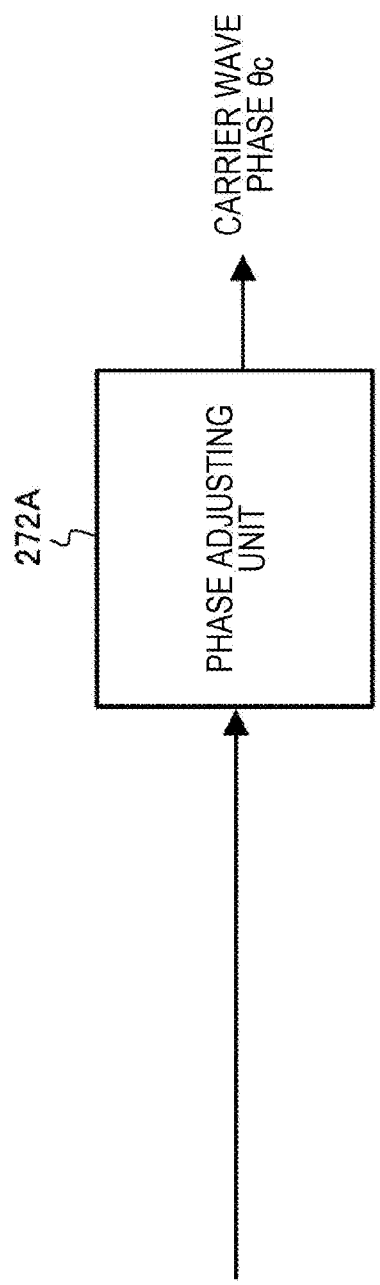
FIG. 20 is a functional block diagram of a vibration/noise suppressing unit according to the second embodiment of the present invention.

FIG. 20 is a functional block diagram of the vibration/noise suppressing unit 270 according to the second embodiment of the present invention. As illustrated in FIG. 20, the vibration/noise suppressing unit 270 according to the present embodiment includes a phase adjusting unit 272A instead of a superimposition deciding unit 271 and a phase adjusting unit 272 in FIG. 5 described in the first embodiment.

The phase adjusting unit 272A determines a phase of a carrier wave used for PWM modulation based on the vibration signal S output from the vibration sensor 401, and outputs a carrier wave phase signal θc. More specifically, for example, the phase adjusting unit 272A calculates a magnitude of vibration of the motor 100 from the vibration signal S and, when this magnitude is a predetermined value or more, outputs the carrier wave phase signal θc to shift the phase of the carrier wave little by little. As a result, when the magnitude of the vibration of the motor 100 is less than the predetermined value, the phase adjusting unit 272A outputs the carrier wave phase signal θc to stop the change of the phase of the carrier wave. Consequently, the phase adjusting unit 272A can adjust the second phase to reduce the vibration of the motor 100 such that the first phase and the second phase are not superimposed on each other.

According to the above-described second embodiment of the present invention, the controller 200 includes a PWM modulating unit 260 and a phase adjusting unit 272A. The PWM modulating unit 260 performs PWM modulation by using the carrier wave of a predetermined carrier frequency fc, and generates drive signals Gu, Gv, and Gw for controlling a switching operation of the IGBTs 311. The phase adjusting unit 272A adjusts a second phase based on the vibration signal S output from the vibration sensor 401 which detects vibration of the motor 100. Thus, it is possible to easily and reliably reduce vibration caused by the motor 100.

Third Embodiment

Figure 21:
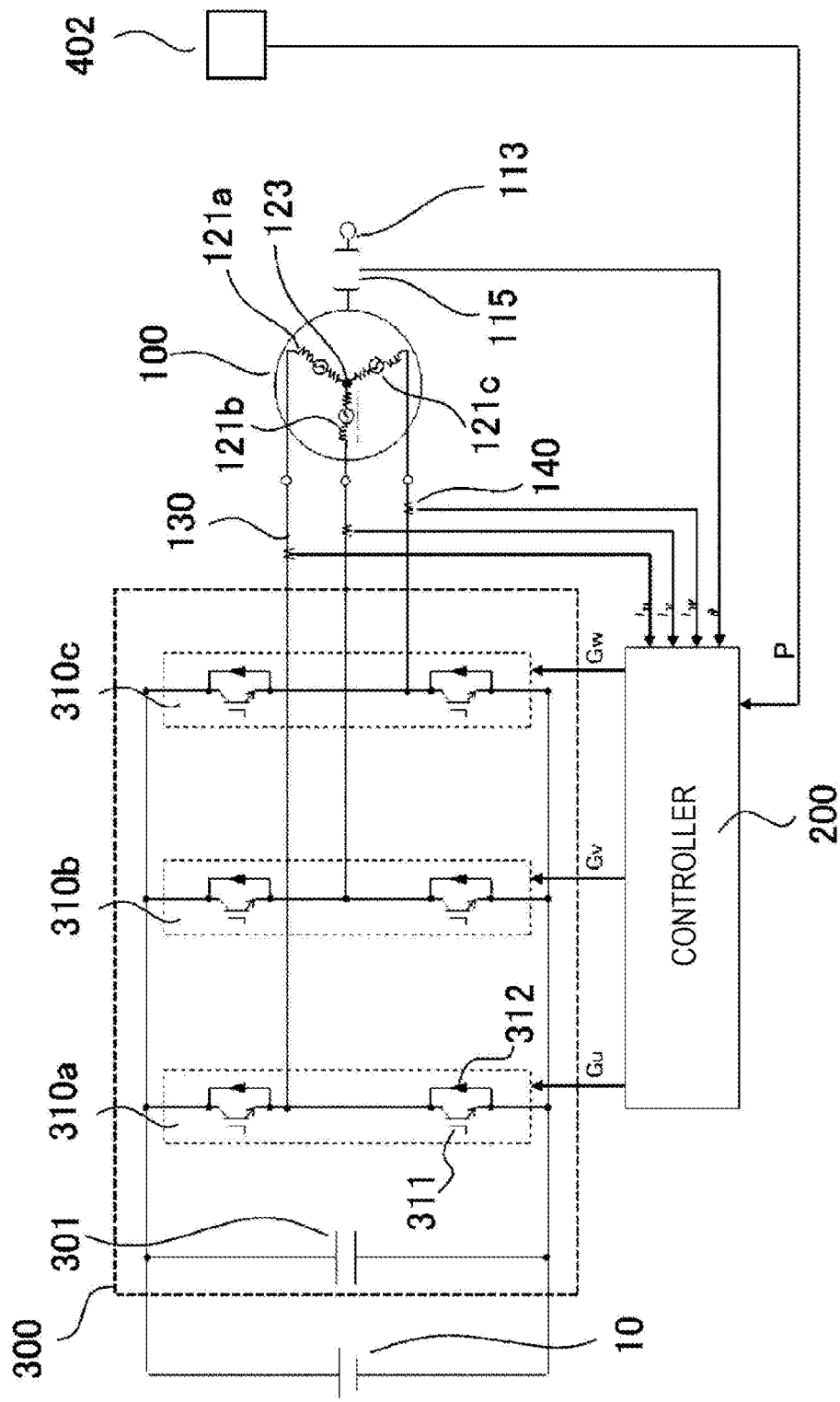
FIG. 21 is a diagram illustrating a configuration of a motor driving system according to a third embodiment of the present invention.

Next, the third embodiment of the present invention will be described. FIG. 21 is a diagram illustrating a configuration of a motor driving system 1B according to the third embodiment of the present invention. The motor driving system 1B illustrated in FIG. 21 differs in further including a sound pressure sensor 402 from a motor driving system 1 described in the first embodiment.

The sound pressure sensor 402 detects a sound emitted by the motor 100, and outputs a sound pressure signal P corresponding to this detection result to a controller 200. The sound pressure sensor 402 is installed around the motor 100.

Similarly to the second embodiment, according to the present embodiment, too, the controller 200 functionally includes the same components as those in the functional block diagram in FIG. 2 described in the first embodiment. However, control contents performed in a vibration/noise suppressing unit 270 is different from that in the first embodiment. This point will be described in more detail below.

Figure 22:
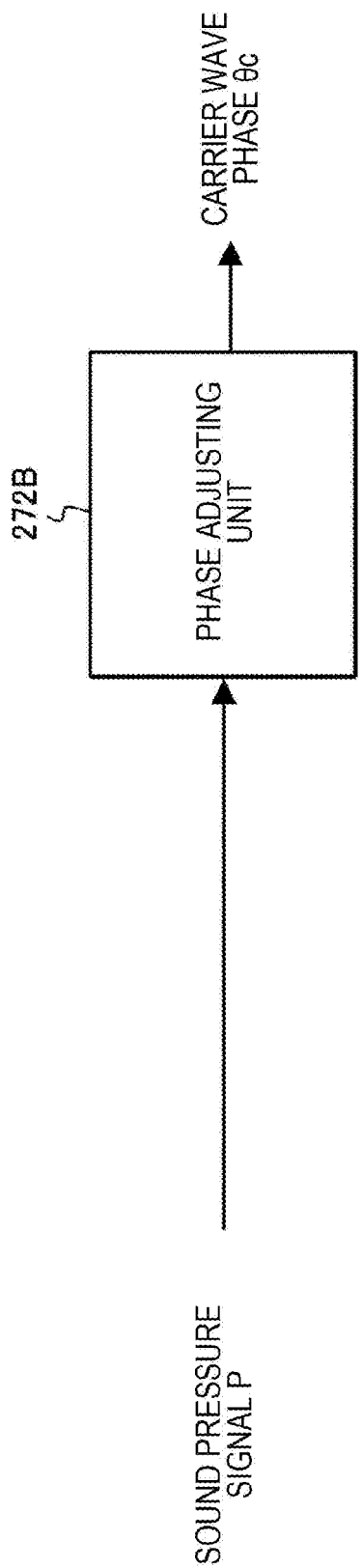
FIG. 22 is a functional block diagram of a vibration/noise suppressing unit according to the third embodiment of the present invention.

FIG. 22 is a functional block diagram of the vibration/noise suppressing unit 270 according to the third embodiment of the present invention. As illustrated in FIG. 22, the vibration/noise suppressing unit 270 according to the present embodiment includes a phase adjusting unit 272B instead of a superimposition deciding unit 271 and a phase adjusting unit 272 in FIG. 5 described in the first embodiment.

The phase adjusting unit 272B determines a phase of a carrier wave used for PWM modulation based on the sound pressure signal P output from the sound pressure sensor 402, and outputs a carrier wave phase signal θc. More specifically, for example, the phase adjusting unit 272B calculates a magnitude of the sound of the motor 100 from the sound pressure signal P and, when this magnitude is a predetermined value or more, outputs the carrier wave phase signal θc to shift the phase of the carrier wave little by little. As a result, when the magnitude of the sound of the motor 100 is less than the predetermined value, the phase adjusting unit 272B outputs the carrier wave phase signal θc to stop the change of the phase of the carrier wave. Consequently, the phase adjusting unit 272B can adjust the second phase to reduce the noise of the motor 100 such that the first phase and the second phase are not superimposed on each other.

According to the above-described third embodiment of the present invention, the controller 200 includes a PWM modulating unit 260 and the phase adjusting unit 272B. The PWM modulating unit 260 performs PWM modulation by using the carrier wave of a predetermined carrier frequency fc, and generates drive signals Gu, Gv, and Gw for controlling a switching operation of IGBTs 311. The phase adjusting unit 272B adjusts the second phase based on the sound pressure signal P output from the sound pressure sensor 402 which detects the sound emitted by the motor 100. Thus, it is possible to easily and reliably reduce the noise caused by the motor 100.

Phase adjusting unit 272A and 272B in each of the above-described second and third embodiments may be used in combination with the superimposition deciding unit 271 described in the first embodiment. In this case, the phase adjusting units 272A and 272B preferably perform the same control as that performed by the phase adjusting unit 272 described in the first embodiment, then adjust the phase of the carrier wave to reduce vibration and noise caused by the motor 100 based on a vibration signal S and the sound pressure signal P, and adjust the second phase. By so doing, it is possible to further reduce the vibration and the noise caused by the motor 100.

Each of the above-described embodiments is an only exemplary embodiment, and the present invention is not limited to these items of contents as long as features of the invention are not undermined. Furthermore, the various embodiments have been described above. However, the present invention is not limited to these items of contents. Other aspects which are conceivable within the scope of the technical idea of the present invention are also included in the scope of the present invention.

REFERENCE SIGNS LIST 1, 1A, 1B motor driving system
10 direct current power supply
100 motor
113 output shaft
115 magnetic pole position detector
121a U phase winding
121b V phase winding
121c W phase winding
123 neutral point
130 alternating current output line
140 current sensor
200 controller
210 current converting unit
220 rotation computing unit
230 current command generating unit
240 current control unit
250 three-phase voltage converting unit
260 PWM modulating unit
270 vibration/noise suppressing unit
271 superimposition deciding unit
272, 272A, 272B phase adjusting unit
300 inverter circuit
301 smoothing capacitor
310a U phase bridge circuit
310b V phase bridge circuit
310c W phase bridge circuit 311 IGBT
312 diode
401 vibration sensor
402 sound pressure sensor

The invention claimed is:

1. An inverter control device comprising: a controller configured to control an inverter which generates an alternating current from a direct current by using a plurality of switching elements, supplies the generated alternating current to a motor, and drives the motor, wherein the alternating current includes a fundamental harmonic current corresponding to a rotational speed of the motor, and a harmonic current of a switching operation of the switching elements, and a second phase is controlled such that a first phase and the second phase are not superimposed on each other at a predetermined motor rotational speed, the first phase being a phase of an excitation force cyclically produced in the motor by the fundamental harmonic current, and the second phase being a phase of an excitation force cyclically produced in the motor by the harmonic current, wherein the inverter control device further comprises: a phase adjuster which: calculates a magnitude of vibration of the motor based on a vibration signal output from a vibration sensor which detects vibration of the motor; and responsive to determining the magnitude of vibration exceeds a predetermined value, outputs a carrier wave phase signal comprising a carrier wave phase to a PWM modulator; and the PWM modulator which receives the carrier wave phase signal from the phase adjuster and performs PWM modulation by using a carrier wave having the carrier wave phase, and generates a signal for controlling the switching operation of the switching elements according to the carrier wave.

2. The inverter control device according to claim 1, further comprising:
a superimposition processor which decides whether or not there is a probability that the first phase and the second phase are superimposed based on the rotational speed of the motor and a predetermined carrier frequency of the carrier wave,
wherein the phase adjuster, when the superimposition processor decides that there is the probability that the first phase and the second phase are superimposed, adjusts the second phase such that the second phase is not superimposed on the first phase.

3. The inverter control device according to claim 2, wherein
the phase adjuster estimates the first phase based on a torque command value for a torque produced by the motor or a current command value for the alternating current, and a magnetic pole position of the motor, and adjusts the second phase based on the estimated first phase.

4. The inverter control device according to claim 3, wherein
the phase adjuster estimates as the first phase each of a phase of an excitation force produced in an axial rotation direction of the motor by the fundamental harmonic current, and a phase of an excitation force produced in a radial direction of the motor by the fundamental harmonic current.

5. The inverter control device according to claim 2, wherein
the phase adjuster adjusts the second phase by adjusting the carrier wave phase of the carrier wave.

6. An inverter control device comprising: a controller control an inverter which generates an alternating current from a direct current by using a plurality of switching elements, supplies the generated alternating current to a motor, and drives the motor, wherein the alternating current includes a fundamental harmonic current corresponding to a rotational speed of the motor, and a harmonic current of a switching operation of the switching elements, and a second phase is controlled such that a first phase and the second phase are not superimposed on each other at a predetermined motor rotational speed, the first phase being a phase of an excitation force cyclically produced in the motor by the fundamental harmonic current, and the second phase being a phase of an excitation force cyclically produced in the motor by the harmonic current, wherein the inverter control device further comprises: a phase adjuster which: calculates a magnitude of a sound of the motor based on a sound pressure signal output from a sound pressure sensor which detects sounds from the motor; and responsive to determining the magnitude of the sound of the motor exceeds a predetermined value, outputs a carrier wave phase signal comprising a carrier wave phase to a PWM modulator; and the PWM modulator which receives the carrier wave phase signal from the phase adjuster and performs PWM modulation by using a carrier wave having the carrier wave phase, and generates a signal for controlling the switching operation of the switching elements according to the carrier wave.

* * * * *